US008431624B2

(12) United States Patent
Domschke et al.

(10) Patent No.: US 8,431,624 B2
(45) Date of Patent: Apr. 30, 2013

(54) PREPOLYMERS SUITABLE FOR MAKING ULTRA-VIOLET ABSORBING CONTACT LENSES

(75) Inventors: Angelika Maria Domschke, Duluth, GA (US); Troy Vernon Holland, Suwanee, GA (US); Richard Charles Turek, Atlanta, GA (US)

(73) Assignee: Novartis AG, Basel (CH)

( * ) Notice: Subject to any disclaimer, the term of this patent is extended or adjusted under 35 U.S.C. 154(b) by 220 days.

(21) Appl. No.: 12/880,237

(22) Filed: Sep. 13, 2010

(65) Prior Publication Data

US 2011/0063567 A1  Mar. 17, 2011

Related U.S. Application Data

(60) Provisional application No. 61/242,405, filed on Sep. 15, 2009.

(51) Int. Cl.
*G02B 1/04* (2006.01)
*G02C 7/04* (2006.01)

(52) U.S. Cl.
USPC ........... 523/107; 523/106; 526/258; 526/261; 526/303.1; 526/307.7; 526/316; 526/319; 526/328; 526/328.5

(58) Field of Classification Search .................... None
See application file for complete search history.

(56) References Cited

U.S. PATENT DOCUMENTS

| | | |
|---|---|---|
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,245,069 A | 1/1981 | Covington |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,312,575 A | 1/1982 | Peyman |
| 4,327,203 A | 4/1982 | Deichert |
| 4,341,889 A | 7/1982 | Deichert |
| 4,343,927 A | 8/1982 | Chang |
| 4,355,147 A | 10/1982 | Deichert |
| 4,444,711 A | 4/1984 | Schad |
| 4,460,534 A | 7/1984 | Boehm |
| 4,486,577 A | 12/1984 | Mueller |
| 4,543,398 A | 9/1985 | Bany |
| 4,605,712 A | 8/1986 | Mueller |
| 4,632,844 A | 12/1986 | Yanagihara |
| 4,661,575 A | 4/1987 | Tom |
| 4,684,538 A | 8/1987 | Klemarczyk |
| 4,703,097 A | 10/1987 | Wingler |
| 4,711,943 A | 12/1987 | Harvey, III |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,164,462 A | 11/1992 | Yang |
| 5,224,957 A | 7/1993 | Gasser |
| 5,227,432 A | 7/1993 | Jung |
| 5,244,981 A | 9/1993 | Seidner |
| 5,314,960 A | 5/1994 | Spinelli |
| 5,314,961 A | 5/1994 | Anton |
| 5,331,067 A | 7/1994 | Seidner |
| 5,346,946 A | 9/1994 | Yokoyama |
| 5,352,753 A | 10/1994 | Yang |
| 5,358,995 A | 10/1994 | Lai |
| 5,376,637 A | 12/1994 | Sawai |
| 5,387,632 A | 2/1995 | Lai |
| 5,416,132 A | 5/1995 | Yokoyama |
| 5,449,729 A | 9/1995 | Lai |
| 5,451,617 A | 9/1995 | Lai |
| 5,466,768 A | 11/1995 | Yang |
| 5,480,927 A | 1/1996 | Janssen |
| 5,486,579 A | 1/1996 | Lai |

(Continued)

FOREIGN PATENT DOCUMENTS

| | | |
|---|---|---|
| EP | 0425436 A2 | 5/1991 |
| EP | 0677561 A1 | 10/1995 |

(Continued)

OTHER PUBLICATIONS

PCT International Search Report dated Oct. 26, 2010, International Application No. PCT/US10/48561, International Filing Date Sep. 13, 2010.

(Continued)

*Primary Examiner* — Marc Zimmer
(74) *Attorney, Agent, or Firm* — Jian Zhou

(57) ABSTRACT

The invention provides a class of actinically-crosslinkable silicone-containing prepolymers which comprise (1) ethylenically-unsaturated groups and (2) UV-absorbing polymeric units, latent UV-absorbing polymeric units, and/or dual photo-functional polymeric units. The prepolymer of the invention can be used to prepare silicone hydrogel contact lenses capable of absorbing UV/visible radiation. The present invention is also related to silicone hydrogel contact lenses made from a prepolymer of the invention and methods for making the contact lenses in a cost-effective way and with high consistency and high fidelity to the original lens design.

9 Claims, No Drawings

U.S. PATENT DOCUMENTS

| | | | |
|---|---|---|---|
| 5,489,474 | A | 2/1996 | Shinoda |
| 5,508,317 | A | 4/1996 | Müller |
| 5,512,205 | A | 4/1996 | Lai |
| 5,527,925 | A | 6/1996 | Chabrecek |
| 5,559,163 | A | 9/1996 | Dawson |
| 5,583,163 | A | 12/1996 | Müller |
| 5,612,389 | A | 3/1997 | Chabrecek |
| 5,612,391 | A | 3/1997 | Chabrecek |
| 5,621,018 | A | 4/1997 | Chabrecek |
| 5,637,726 | A | 6/1997 | Collins |
| 5,663,288 | A | 9/1997 | Shinoda |
| 5,665,840 | A | 9/1997 | Pöhlmann |
| 5,681,871 | A | 10/1997 | Molock |
| 5,712,356 | A | 1/1998 | Bothe |
| 5,723,512 | A | 3/1998 | Leppard |
| 5,729,322 | A | 3/1998 | Collins |
| 5,760,100 | A | 6/1998 | Nicolson |
| 5,767,169 | A | 6/1998 | Leppard |
| 5,789,464 | A | 8/1998 | Müller |
| 5,843,346 | A | 12/1998 | Morrill |
| 5,849,810 | A | 12/1998 | Müller |
| 5,849,811 | A | 12/1998 | Nicolson |
| 5,849,841 | A | 12/1998 | Mühlebach |
| 5,866,635 | A | 2/1999 | Collins |
| 5,894,002 | A | 4/1999 | Boneberger |
| 5,914,355 | A | 6/1999 | Künzler |
| 5,959,117 | A | 9/1999 | Ozark |
| 5,962,548 | A | 10/1999 | Vanderlaan |
| 5,965,776 | A | 10/1999 | Leppard |
| 5,981,615 | A | 11/1999 | Meijs |
| 5,981,669 | A | 11/1999 | Valint, Jr. |
| 5,981,675 | A | 11/1999 | Valint, Jr. |
| 5,989,462 | A | 11/1999 | Buazza |
| 6,015,842 | A | 1/2000 | LeBoeuf |
| 6,015,874 | A | 1/2000 | Hiratani |
| 6,020,528 | A | 2/2000 | Leppard |
| 6,036,891 | A | 3/2000 | Liao |
| 6,039,913 | A | 3/2000 | Hirt |
| 6,096,846 | A | 8/2000 | Oda |
| 6,136,880 | A | 10/2000 | Snowwhite |
| 6,149,692 | A | 11/2000 | Lally |
| 6,153,760 | A | 11/2000 | Künzler |
| 6,162,844 | A | 12/2000 | Lally |
| 6,165,408 | A | 12/2000 | Steinmann |
| 6,218,463 | B1 * | 4/2001 | Molock et al. ............... 524/720 |
| 6,221,303 | B1 | 4/2001 | Steinmann |
| 6,252,032 | B1 | 6/2001 | Van Antwerp |
| 6,284,813 | B1 | 9/2001 | Leppard |
| 6,303,687 | B1 | 10/2001 | Müller |
| 6,310,215 | B1 | 10/2001 | Iwamoto |
| 6,329,485 | B1 | 12/2001 | Vanderbilt |
| 6,359,024 | B2 | 3/2002 | Lai |
| 6,359,025 | B1 | 3/2002 | Snowwhite |
| 6,361,925 | B1 | 3/2002 | Leppard |
| 6,451,871 | B1 | 9/2002 | Winterton |
| 6,465,538 | B2 | 10/2002 | Lai |
| 6,472,489 | B1 | 10/2002 | Stockinger |
| 6,479,587 | B1 | 11/2002 | Stockinger |
| 6,492,478 | B1 | 12/2002 | Steinmann |
| 6,627,124 | B1 | 9/2003 | Herbrechtsmeier |
| 6,657,029 | B2 | 12/2003 | Vanderbilt |
| 6,657,030 | B2 | 12/2003 | Vanderbilt |
| 6,657,032 | B2 | 12/2003 | Vanderbilt |
| 6,673,886 | B2 | 1/2004 | Vanderbilt |
| 6,713,583 | B2 | 3/2004 | Liao |
| 6,719,929 | B2 | 4/2004 | Winterton |
| 6,762,264 | B2 | 7/2004 | Künzler |
| 6,776,934 | B2 | 8/2004 | Lai |
| 6,793,973 | B2 | 9/2004 | Winterton |
| 6,800,225 | B1 | 10/2004 | Hagmann |
| 6,811,805 | B2 | 11/2004 | Gilliard |
| 6,852,793 | B2 | 2/2005 | Salamone |
| 6,896,926 | B2 | 5/2005 | Qiu |
| 6,995,192 | B2 | 2/2006 | Phelan |
| 7,384,590 | B2 | 6/2008 | Kelly |
| 7,387,759 | B2 | 6/2008 | Kelly |
| 7,390,863 | B2 * | 6/2008 | Salamone et al. ............ 526/279 |
| 7,423,074 | B2 * | 9/2008 | Lai et al. ...................... 523/106 |
| 8,324,256 | B2 * | 12/2012 | Domschke et al. .......... 514/359 |
| 2002/0042022 | A1 | 4/2002 | Leppard |
| 2003/0125498 | A1 | 7/2003 | McCabe |
| 2004/0082680 | A1 | 4/2004 | Phelan |
| 2004/0157948 | A1 * | 8/2004 | Schlueter ...................... 522/32 |
| 2005/0055090 | A1 | 3/2005 | Lai |
| 2005/0113549 | A1 | 5/2005 | Devlin |
| 2006/0069178 | A1 | 3/2006 | Rastogi |
| 2006/0252850 | A1 | 11/2006 | Jani |
| 2007/0092830 | A1 | 4/2007 | Lai |
| 2007/0092831 | A1 | 4/2007 | Lai |
| 2008/0015315 | A1 | 1/2008 | Chang |
| 2008/0143958 | A1 | 6/2008 | Medina |
| 2008/0231798 | A1 | 9/2008 | Zhou |
| 2009/0005528 | A1 | 1/2009 | Fujisawa |
| 2009/0171026 | A1 * | 7/2009 | Fujisawa et al. ............. 525/103 |
| 2010/0168359 | A1 | 7/2010 | Domschke |
| 2010/0296049 | A1 * | 11/2010 | Justynska et al. ......... 351/160 H |

FOREIGN PATENT DOCUMENTS

| | | |
|---|---|---|
| GB | 2292740 A | 3/1996 |
| GB | 2310855 A | 9/1997 |
| WO | 9628762 A1 | 9/1996 |
| WO | 9805690 A1 | 2/1998 |
| WO | 9847954 A1 | 10/1998 |
| WO | 9933894 A1 | 7/1999 |

OTHER PUBLICATIONS

PCT Written Opinion of the International Searching Authority dated Oct. 26, 2010, International Application No. PCT/US10/48561, International Filing Date Sep. 13, 2010.

* cited by examiner

PREPOLYMERS SUITABLE FOR MAKING ULTRA-VIOLET ABSORBING CONTACT LENSES

This application claims the benefit under 35 U.S.C. §119 (e) of U.S. provisional application Ser. No. 61/242,405 filed on Sep. 15, 2009, herein incorporated by reference in its entirety.

The present invention is related to a class of silicone-containing prepolymers containing ultra-violet (UV) absorbing moieties and methods for making the same. In addition, the present invention is related to UV-absorbing silicone hydrogel contact lenses made from this class of silicone-containing prepolymers.

BACKGROUND

Most commercially-available silicone hydrogel contact lenses are produced according to a conventional cast molding technique involving use of disposable plastic molds and a mixture of monomers in the presence or absence of macromers. However, disposable plastic molds inherently have unavoidable dimensional variations, because, during injection-molding of plastic molds, fluctuations in the dimensions of molds can occur as a result of fluctuations in the production process (temperatures, pressures, material properties), and also because the resultant molds may undergo non-uniformly shrinking after the injection molding. These dimensional changes in the mold may lead to fluctuations in the parameters of contact lenses to be produced (peak refractive index, diameter, basic curve, central thickness etc.) and to a low fidelity in duplicating complex lens design.

Such disadvantages encountered in a conventional cast-molding technique can be overcome by using the so-called Lightstream Technology™ (CIBA Vision), as illustrated in U.S. Pat. Nos. 5,508,317, 5,789,464, 5,849,810, and 6,800,225, which are incorporated by reference in their entireties. The Lightstream Technology™ involves (1) a lens-forming composition which is typically a solution of one or more substantially purified prepolymer with ethylenically unsaturated groups and which generally is substantially free of monomers and crosslinking agents with a small molecular weight, (2) reusable molds produced in high precision, and (3) curing under a spatial limitation of actinic radiation (e.g., UV). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield.

However, there is no actinically-crosslinkable siloxane-containing prepolymer suitable for making UV-absorbing silicone hydrogel contact lenses according to the Lightstream Technology™. Therefore, there is still a need for such prepolymers.

SUMMARY OF THE INVENTION

In one aspect, the invention provides an actinically crosslinkable prepolymer capable of being crosslinked to form a UV absorbing or blocking silicone hydrogel contact lens. The prepolymer of the invention comprises: in the branched copolymer chains of the prepolymer, (1) crosslinking polysiloxane polymeric units derived from at least one polysiloxane-containing crosslinker; (2) hydrophilic polymeric units derived from one or more hydrophilic vinylic monomers; (3) UV-absorbing polymeric units, latent UV-absorbing polymeric units, or dual photo-functional polymeric units, wherein the UV-absorbing polymeric units are derived from a polymerizable UV-absorbing agent, wherein the latent UV-absorbing polymeric units are derived from a polymerizable latent UV-absorbing agent, wherein the dual photo-functional polymeric units are derived from a polymerizable compound having a photoinitiating moiety and a UV-absorbing or latent UV-absorbing moiety; (4) optionally dangling polysiloxane polymeric units derived from one or more monoethylenically functionalized polysiloxane-containing vinylic monomers or macromers, wherein the dangling polysiloxane units is free of ethylenically unsaturated group; and (5) optionally siloxane polymeric units derived from at least one siloxane-containing vinylic monomer, wherein the prepolymer comprises three or more ethylenically unsaturated groups and is soluble in a solvent to form a solution and capable of being actinically crosslinked, in the absence of one or more monomers, to form a silicone hydrogel material.

In another aspect, the invention provides a UV-absorbing silicone hydrogel contact lens made from a lens-forming material including an actinically-crosslinkable prepolymer of the invention.

In a further aspect, the invention provides a method for producing UV-absorbing silicone hydrogel contact lenses from an actinically-crosslinkable prepolymer of the invention.

The invention also provides a method for preparing an actinically-crosslinkable prepolymer of the invention.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing vinylic macromer or at least one crosslinkable silicone-containing prepolymer.

A "vinylic monomer", as used herein, refers to a monomer that has one sole ethylenically unsaturated group and can be polymerized actinically or thermally.

The term "olefinically unsaturated group" or "ethylenically unsaturated group" is employed herein in a broad sense and is intended to encompass any groups containing a >C=C< group. Exemplary ethylenically unsaturated groups include without limitation

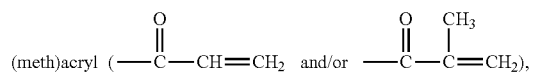

allyl, vinyl 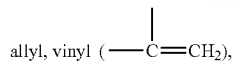
styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionized radiation (e.g. gamma ray or X-ray irradiation), microwave irradiation, and the like. Thermal curing or actinic curing methods are well-known to a person skilled in the art.

The term "fluid" as used herein indicates that a material is capable of flowing like a liquid.

A "hydrophilic vinylic monomer" refers to a vinylic monomer which can be polymerized to form a polymer that is water-soluble or can absorb at least 10 percent by weight of water.

A "hydrophobic vinylic monomer", as used herein, refers to a vinylic monomer which is polymerized to form a polymer that is insoluble in water and can absorb less than 10 percent by weight of water.

A "vinylic macromer" or "macromer" refers to a macromer which can be polymerized actinically and comprises one or more ethylenically unsaturated groups. Medium and high molecular weight typically means average molecular weights greater than 700 Daltons.

A "prepolymer" refers to a starting polymer which contains one or more ethylenically unsaturated groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the weight-average molecular weight unless otherwise specifically noted or unless testing conditions indicate otherwise.

"Polymer" means a material formed by polymerizing one or more monomers.

As used herein, the term "ethylenically functionalize" in reference to a copolymer or a compound is intended to describe that one or more actinically crosslinkable groups have been covalently attached to a copolymer or compound through the pendant or terminal functional groups of the copolymer or the compound according to a coupling process.

As used herein, the term "multiple" refers to three or more.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is a radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

"Dye" means a substance that is soluble in a solvent or a lens forming fluid material and that is used to impart color. Dyes are typically translucent and absorb but do not scatter light.

A "Pigment" means a powdered substance that is suspended in a liquid (e.g., a lens forming fluid material) in which it is insoluble.

An "antimicrobial agent", as used herein, refers to a chemical that is capable of decreasing or eliminating or inhibiting the growth of microorganisms such as that term is known in the art. Preferred examples of antimicrobial agent include without limitation silver salts, silver complexes, silver nanoparticles, silver-containing zeolites, and the likes "Silver nanoparticles" refer to particles which is made essentially of silver metal and have a size of less than 1 micrometer.

A "polymerizable UV-absorbing agent" refers to a compound comprising an ethylenically-unsaturated group and a UV-absorbing moiety which can absorb or screen out UV/visible radiation in the range from 200 nm to 400 nm as understood by a person skilled in the art.

A "polymerizable latent UV-absorbing agent" refers to a compound comprising an ethylenically unsaturated group and a UV-absorbing moiety which has been protected by a labile functional group so that its absorbance of UV/visible radiation in the wavelength region from 200 nm to 400 nm are about 50% or less, preferably 70% or less, more preferably about 90% or less of those of the UV-absorbing moiety without the protected labile function group.

The term "labile functional group" means a protective functional group which can be removed (cleaved) from another functional group being protected by the protective functional group by any chemical means.

The intrinsic "oxygen permeability", Dk, of a material is the rate at which oxygen will pass through a material. In accordance with the invention, the term "oxygen permeability (Dk)" in reference to a contact lens means an apparent oxygen permeability which is measured with a sample (film or lens) having an average thickness over the area being measured according to a known method. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The "ion permeability" through a lens correlates with the lonoflux Diffusion Coefficient. The lonoflux Diffusion Coefficient, D (in units of $[mm^2/min]$), is determined by applying Fick's law as follows:

$$D = -n'/(A \times dc/dx)$$

where n'=rate of ion transport [mol/min]; A=area of lens exposed $[mm^2]$; dc=concentration difference [mol/L]; dx=thickness of lens [mm].

In general, the invention is directed to a class of actinically crosslinkable silicone-containing prepolymers with UV-absorbing polymeric units, latent UV-absorbing polymeric units, or dual photoinitiating and latent UV-absorbing polymeric units. Such prepolymers can be used to prepare silicone hydrogel contact lenses with UV-absorbing property, in particularly according to the Lightstream Technology™ (CIBA Vision).

There are several potential unique features associated with use of prepolymers of the invention in making silicone hydrogel contact lens. First, a prepolymer of the invention can be cured actinically on a timescale of seconds to produce contact lenses having no or minimal internal stress caused by larger radiation intensity gradients. The intensity gradient is how much of the light used for curing is absorbed by a lens formulation. As such, prepolymers of the invention can fully utilize the advantages provided by the Lightstream Technology™ in make silicone hydrogel contact lenses at a relatively lower cost and at high consistency and high fidelity to the original lens design. Second, use of a prepolymer of the invention in making UV-absorbing contact lenses can ensure reproducible UV-absorbing properties of the produced lenses, since the UV absorbing moiety is attached covalently to the backbone of a high molecular weight prepolymer which can not leach out from the lenses.

In one aspect, the invention provides an actinically crosslinkable prepolymer capable of being crosslinked to form a UV absorbing or blocking silicone hydrogel contact lens. The prepolymer of the invention comprises: in the branched copolymer chains of the prepolymer, (1) crosslinking polysiloxane polymeric units derived from at least one polysiloxane-containing crosslinker; (2) hydrophilic polymeric units derived from one or more hydrophilic vinylic monomers; (3) UV-absorbing polymeric units, latent UV-absorbing polymeric units, or dual photo-functional polymeric units, wherein the UV-absorbing polymeric units are derived from a polymerizable UV-absorbing agent, wherein the latent UV-absorbing polymeric units are derived from a polymerizable latent UV-absorbing agent, wherein the dual photo-functional polymeric units are derived from a polymerizable compound having a photoinitiating moiety and a UV-absorbing or latent UV-absorbing moiety; (4) optionally dangling polysiloxane polymeric units derived from one or more monoethylenically functionalized polysiloxane-containing vinylic monomers or macromers, wherein the dangling polysiloxane units is free of ethylenically unsaturated group; and (5) optionally siloxane polymeric units derived from at least one siloxane-containing vinylic monomer, wherein the prepolymer comprises one or more ethylenically unsaturated groups and is soluble in a solvent to form a solution and capable of being actinically crosslinked, in the absence of one or more monomers, to form a silicone hydrogel material.

The term "derived" in reference to a polymeric unit means that the polymeric unit is obtained from a vinylic monomer or a crosslinker (i.e., a compound or macromer or polymer having two or more ethylenically-unsaturated groups) in a free-radical copolymerization reaction involving ethylenically unsaturated groups and becomes a structural part of a polymer.

A "polysiloxane crosslinker" refers to a compound or polymer containing at least two ethylenically unsaturated groups and a divalent radical of

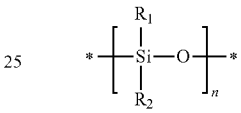

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, trimethylsiloxyl, -alk-$(OCH_2CH_2)_m$—$OR_3$ in which alk is $C_1$-$C_6$ alkylene divalent radical, $R_3$ is hydrogen or $C_1$-$C_6$ alkyl, and m is an integer of from 1 to 10; n is an integer of 2 to 800.

Any suitable polysiloxane crosslinkers can be used in the invention. Examples of such polysiloxane crosslinkers are dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; Polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyakyleneoxides could also be of utility. For example one might use methacrylate end capped polyethyleneoxide-block-polydimethylsiloxane-block-polyethyleneoxide to enhance oxygen permeability.

In a preferred embodiment, a polysiloxane crosslinker is defined by formula (1)

$$Q-X_1-A_1-PDMS-A_2-X_2-Q \tag{1}$$

in which $A_1$ and $A_2$ independent of each other is a linear or branched $C_1$-$C_{10}$ alkyl divalent radical, a divalent radical of

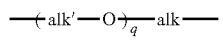

in which q is an integer of from 1 to 5 and alk and alk' independent of each other is a $C_1$-$C_6$ alkylene divalent radical, or a divalent radical of —$R'_1$—$X_4$-E-$X_5$—$R'_2$— in which $R'_1$ and $R'_2$ independent of each other is a direct bond, a linear or branched $C_1$-$C_{10}$ alkylene divalent radical, or a divalent radical of

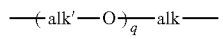

as defined above, $X_4$ and $X_5$ independent of each other are a linkage selected from the group consisting of

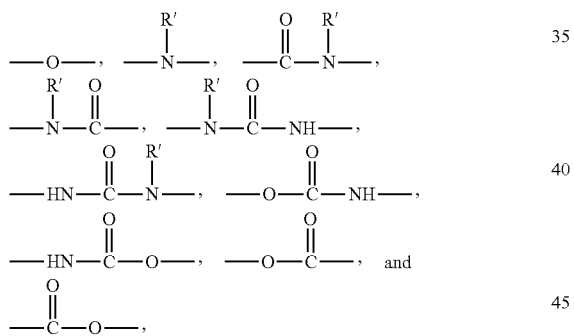

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms;

$X_1$ and $X_2$ independent of each other are a linkage selected from the group consisting of a direct bond,

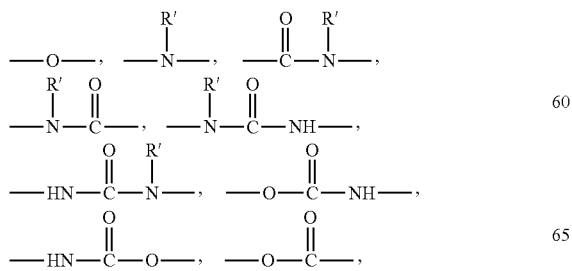

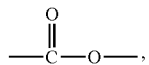

in which R' is H or $C_1$-$C_8$ alkyl;

PDMS is a polysiloxane divalent radical of formula (2)

in which v is 0 or 1, ω is an integer of from 0 to 5, $U_1$ and $U_2$ independent of each other represent a divalent radical of —$R'_1$—$X_4$-E-$X_5$—$R'_2$— as defined above or a divalent radical of

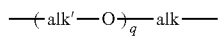

as defined above, $D_1$, $D_2$ and $D_3$ independently of each other are a divalent radical selected from the group consisting of —$(CH_2CH_2O)_t$—$CH_2CH_2$— in which t is an integer of 3 to 40, —$CF_2$—$(OCF_2)_a$—$(OCF_2CF_2)_b$—$OCF_2$— in which a and b independent of each other is an integer of 0 to 10 provided that a+b is a number in the range of 10 to 30, and a divalent group of formula (3)

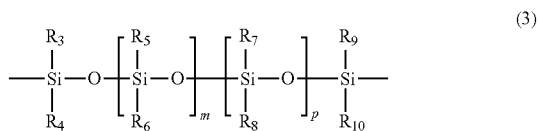

in which $R_3$, $R_4$, $R_5$, $R_6$, $R_7$, $R_8$, $R_9$ and $R_{10}$, independently of one another, are $C_1$-$C_8$-alkyl, $C_1$-$C_4$ alkyl- or $C_1$-$C_4$-alkoxy-substituted phenyl, fluoro($C_1$-$C_{18}$-alkyl), cyano($C_1$-$C_{12}$-alkyl), -alk-$(OCH_2CH_2)_n$—$OR_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (3); and Q is an ethylenically unsaturated group of formula (4)

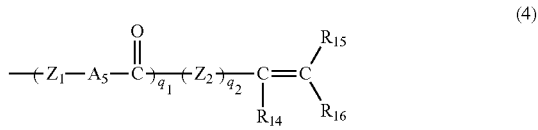

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —$(CH_2CH_2O)_d$—$CH_2CH_2$— in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is

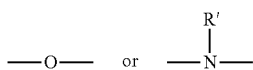

in which R' is H or $C_1$-$C_8$ alkyl; $q_1$ and $q_2$ independent of each other are an integer of 0 or 1; $R_{14}$ is hydrogen or $C_1$-$C_4$ alkyl; $R_{15}$ and $R_{16}$ independent of each other are hydrogen, $C_1$-$C_4$ alkyl, phenyl, or carboxyl group.

A polysiloxane-containing vinylic macromer of formula (1) in which ω is 0 can be obtained from commercial sources or prepared by ethylenically functionalizing a commercially-available di-functional polysiloxane (i.e., having two terminal, first reactive functional groups selected from the group consisting of primary amino groups, secondary amino groups, hydroxyl groups, carboxyl groups, epoxy groups, isocyanate groups, acid anhydride groups, and combinations thereof) using an ethylenically-functionalizing vinylic monomer (i.e., a vinylic monomer having a hydroxyl, amino (primary or secondary), carboxyl, epoxy, aziridine, azlactone, isocyanate, or acid chloride) in the presence or absence of a coupling agent according to a coupling reaction well known to person skilled in the art (or those procedures described below).

Examples of ethylenically-functionalizing vinylic monomers include without limitation $C_2$ to $C_6$ hydroxylalkyl (meth)acrylate, $C_2$ to $C_6$ hydroxyalkyl (meth)acrylamide, allyl alcohol, allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl (meth)acrylamide, $C_1$-$C_6$ alkylamino-$C_2$-$C_6$ alkyl (meth)acrylamide, acrylic acid, $C_1$-$C_4$ alkylacrylic acid (e.g., methacrylic ethylacrylic acid, propylacrylic acid, butylacrylic acid), N-[tris(hydroxymethyl)-methyl]acrylamide, N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxyl-4-phenyl butadiene-1,3, itaconic acid, citraconic acid, mesaconic acid, glutaconic acid, aconitic acid, maleic acid, fumaric acid, aziridinyl $C_1$-$C_{12}$ alkyl (meth)acrylate (e.g., 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), glycidyl (meth)acrylate, vinyl glycidyl ether, allyl glycidyl ether, (meth)acrylic acid halide groups (—COX, X=Cl, Br, or I), $C_1$ to $C_6$ isocyanatoalkyl (meth)acrylate, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), and combinations thereof.

Preferred polysiloxane-containing vinylic macromers of formula (1) in which ω is 0 include without limitation di-3-methacryloxypropyl-terminated polydimethylsiloxane, di-vinyl-terminated polydimethylsiloxane, a coupling product of an ethylenically functionalizing vinylic monomer (selected from the group consisting of isocyanatoethyl (meth)acrylate, glycidyl (meth)acrylate, vinyl glycidyl ether, allyl glycidyl ether, (meth)acrylic acid chloride, 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, 8-(1-aziridinyl) octyl (meth)acrylate, 2-vinyl-4,4-dimethyl-1,3-oxazolin-5-one, 2-isopropenyl-4,4-dimethyl-1,3-oxazolin-5-one, and combination thereof) with di-(hydroxyethoxypropyl)-, di-hydroxy(polyethylenoxy)propyl-, di-(aminopropyl)-, di-ethylaminopropyl-, or di-carboxypropyl-terminated polydimethylsiloxane, a coupling product of an ethylenically functionalizing vinylic monomer (selected from the group consisting of allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl (meth)acrylamide, $C_1$-$C_6$ alkylamino-$C_2$-$C_6$ alkyl (meth)acrylamide, and combinations thereof) with di-carboxypropyl-terminated polydimethylsiloxane in the presence of a carbodiimide as a coupling agent, a coupling product of an ethylenically functionalizing vinylic monomer (selected from the group consisting of (meth)acrylic acid, ethylacrylic acid, propylacrylic acid, butylacrylic acid, 2-acrylamidoglycolic acid, and combinations thereof) with di-aminopropyl- or di-ethylaminopropyl-terminated polydimethylsiloxane in the presence of a carbodiimide as a coupling agent, a coupling product of an ethylenically functionalizing vinylic monomer (selected from the group consisting of $C_2$-$C_4$ hydroxyalkyl (meth)acrylate, $C_2$-$C_4$ hydroxyalkyl (meth)acrylamide, allyl alcohol, allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl (meth)acrylamide, $C_1$-$C_6$ alkylamino-$C_2$-$C_6$ alkyl (meth)acrylamide, (meth)acrylic acid, and combination thereof) with di-(hydroxyethoxypropyl)-, di-(aminopropyl)-, or di-ethylaminopropyl-terminated polydimethylsiloxane through a di-epoxy compound (e.g., 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, or combinations thereof) or a di-isocyanate (e.g., isophorone diisocyanate, hexamethyl-1,6-diisocyanate, or 4,4'-dicyclohexylmethane diisocyanate).

A polysiloxane-containing vinylic macromer of formula (1) in which ω is an integer of from 1 to 5 (preferably ω and ν are integer of 1) can be prepared according to any known procedures, for example, those described in U.S. Pat. Nos. 4,136,250, 4,486,577, 4,605,712, 5,034,461, 5,416,132, and 5,760,100, herein incorporated by reference in their entireties.

Preferably, in formula (2) ν is 0 or 1, ω is an integer of from 1 to 5, $D_1$, $D_2$ and $D_3$ independent of one another are divalent radical of formula (3) in which $R_3$, $R_4$, $R_5$, $R_6$, $R_7$, $R_8$, $R_9$ and $R_{10}$, are methyl, m and p independently of each other are an integer of from 2 to 698, (m+p) is from 5 to 700, $U_1$ and $U_2$ independent of each other represent a divalent radical of —$R'_1$—$X_4$-E-$X_5$—$R'_2$— in which $X_4$ and $X_5$ independent of each other are

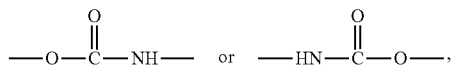

$R_1'$ and $R_2'$ independent of each other is a divalent radical of

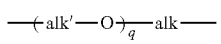

in which q is an integer of from 1 to 5 and alk and alk' independent of each other is a $C_1$-$C_6$ alkylene divalent radical, and E is an alkyl diradical, a cycloalkyl diradical, an alkylcycloalkyl diradical, an alkylaryl diradical, or an aryl diradical with up to 40 carbon atoms; wherein in formula (1) $A_1$ and $A_2$ independent of each other is a linear or branched $C_1$-$C_{10}$ alkyl divalent radical, a divalent radical of

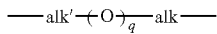

in which q, alk and alk' are defined as above, or a divalent radical of —$R'_1$—$X_4$-E-$X_5$—$R'_2$— in which $R'_1$ and $R'_2$ independent of each other is a direct bond, a linear or branched $C_1$-$C_{10}$ alkylene divalent radical, or a divalent radical of

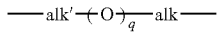

as defined above, $X_4$ and $X_5$ independent of each other are a linkage selected from the group consisting of

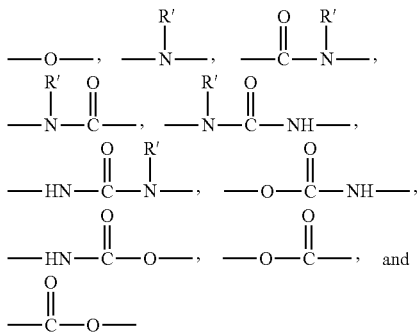

in which R' is H or $C_1$-$C_8$ alkyl, E is defined as above, Q is an ethylenically unsaturated group of formula (4) in which $R_{14}$, $R_{15}$, and $R_{16}$ independent of one another are hydrogen or methyl, $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, or a radical of —$(CH_2CH_2O)_d$—$CH_2CH_2$— in which d is an integer of 1 to 10, $A_5$ is $A_5$ is —O— or

in which R' is H or $C_1$-$C_8$ alkyl, $q_1$ and $q_2$ independent of each other are an integer of 0 or 1.

Nearly any hydrophilic vinylic monomer can be used in the invention. Suitable hydrophilic vinylic monomers are, without this being an exhaustive list, (meth)acrylamide, di-alkyl ($C_1$ to $C_6$) (meth)acrylamide, ($C_1$ to $C_6$) alkyl (meth)acrylamide, hydroxyl-substituted lower alkyl ($C_1$ to $C_6$) (meth) acrylamide, hydroxyl-substituted lower alkyl ($C_1$ to $C_6$) (meth)acrylates, hydroxyl-substituted lower alkyl vinyl ethers, N-vinyl pyrrole, N-vinyl-2-pyrrolidone, 2-vinyloxazoline, 2-vinyl-4,4'-dialkyloxazolin-5-one, 2- and 4-vinylpyridine, olefinically unsaturated carboxylic acids having a total of 3 to 6 carbon atoms, amino(lower alkyl)—(where the term "amino" also includes quaternary ammonium), mono(lower alkylamino)(lower alkyl) and di(lower alkylamino)(lower alkyl)acrylates and methacrylates, allyl alcohol, N-vinyl alkylamide, N-vinyl-N-alkylamide, and the like.

Preferred hydrophilic vinylic monomers are N,N-dimethylacrylamide (DMA), N,N-dimethylmethacrylamide (DMMA), 2-acrylamidoglycolic acid monohydrate, 3-acryloylamino-1-propanol, N-hydroxyethyl acrylamide, N-[tris(hydroxymethyl)methyl]-acrylamide, N-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

Any suitable polymerizable UV-absorbing agents can be used in the invention. Preferably, a polymerizable UV-absorbing agent comprises a benzotriazole-moiety and/or a benzophenone-moiety. Examples of preferred polymerizable UV absorbers include without limitation 2-(2'-hydroxy-5'-(2-methacryloyloxyethyl)phenyl)-benzotriazole, 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole,2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone.

A polymerizable latent UV-absorbing agent can be prepared from a polymerizable UV-absorbing agent described above according to any known method known to a person skilled in the art. For example, a benzotriazole-moiety or a benzophenone-moiety can be reacted with a protected labile group to convert a UV-absorbing moiety into a latent UV-absorbing moiety.

For a benzotriazole-type UV-absorbing agent, the hydroxyl radical of the phenol group of a benzotriazole moiety can be replaced with a protective labile group to render the agent essentially non-UV absorbing (i.e., the protective group essentially shifts the absorption properties of the compound so that the agent does not absorb as strongly in the 320 to 400 nm range). Examples of protective labile groups include without limitation acetyl radical, acetylalkylsilane, alkylether, and alkylester. These protective groups can be converted back to a hydroxyl radical according to any known method after the lens is cured, thus rendering the lens UV-absorbing. For example, removal of protective labile groups can be performed by soaking the cured lens in saturated bicarbonate solution and heating.

Similarly, at least one hydroxyl radical of the phenol group of a benzophenone moiety can be replaced with one of the aforementioned protective labile groups to form a latent UV-absorbing moiety. The latent UV-absorbing moiety can be converted to a UV-absorbing moiety by removing the protective labile group.

A polymerizable compound having a photoinitiating moiety and a UV-absorbing or latent UV-absorbing moiety is preferably one of the trifunctional compounds described in a commonly-owned co-pending U.S. patent application No. 61/141,265 filed Dec. 30, 2008 and entitled "Tri-Functional Compounds Useful in the Production of Ophthalmic Lenses," herein incorporated by reference in its entirety. A person skilled in the art will know how to prepare such compounds.

As an illustrative example, a tri-functional compound can be prepared as follows. Irgacure 2959 (4-(2-hydroxyethoxy) phenyl-(2-hydroxy-2-propyl)ketone) can be reacted with succinic anhydride (reflux in triethylamine/Toluene) to obtain Irgacure 2959-monosuccinate. Norbloc (2-{3-(2H-Benxotriazol-2-yl)-4-hydroxyphenyl}ethyl methacrylate) is reacted with the obtained Irgacure 2959-monosuccinate in the presence of N,N-dicyclohexyl carbodiimide (DCC) and 4-(dimethylamino)pyridine (D-MAP) to obtain conjugated Irgacure 2959-Norbloc.

In a preferred embodiment, an actinically crosslinkable prepolymer of the invention comprises dual photoinitiating and latent UV-absorbing polymeric units. The latent UV-absorbing moiety can be converted to a UV-absorbing moiety by removing the protective labile group.

In accordance with the invention, a monoethylenically functionalized polysiloxane vinylic monomer or macromer is defined by formula (5)

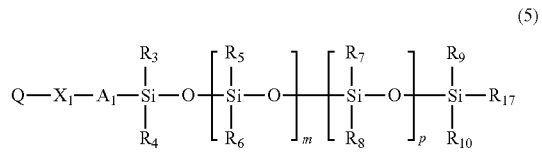

(5)

in which
$X_1$ and $A_1$ are as defined above in formula (1);
$R_3$, $R_4$, $R_5$, $R_6$, $R_7$, $R_8$, $R_9$, $R_{19}$, m, and p are as defined above in formula (3);
$R_{17}$ is a monovalent $C_1$-$C_{25}$ alkyl or $C_6$-$C_{30}$ aryl radical, which may interrupted by —O—, —COO—, —CONR$_{19}$—, —OCOO— or —OCONR$_{19}$— and may comprise hydroxy group, primary, secondary, or tertiary amine group, carboxy group, or carboxylic acid; and
Q is an ethylenically unsaturated group of formula (4) as defined above.

Monoethylenically functionalized polysiloxanes can be obtained from commercial sources or prepared by ethylenically functionalizing of a monofunctionalized polysiloxanes (i.e., with one sole terminal functional group, such as, e.g., primary or secondary amino group, —OH, —COOH, epoxy group, isocyanate group, acid anhydride, etc.) with an ethylenically functionalizing vinylic monomer (any one of those described above) having a functional group coreactive with the terminal functional group of the monofunctionalized polysiloxane in a coupling reaction known to a person skilled in the art. Suitable monofunctional polysiloxanes are commercially available, e.g., from Aldrich, ABCR GmbH & Co., Fluorochem, or Gelest, Inc, Morrisville, Pa. Preferred examples of monoethylenically functionalized polysiloxane vinylic monomers or macromers include without limitation mono-3-methacryloxypropyl terminated, mono-butyl terminated polydimethylsiloxane, mono-vinyl-terminated, mono-alkyl terminated polydimethylsiloxane, a coupling product of an ethylenically functionalizing vinylic monomer (selected from the group consisting of isocyanatoethyl (meth)acrylate, glycidyl (meth)acrylate, vinyl glycidyl ether, allyl glycidyl ether, (meth)acrylic acid chloride, 2-(1-aziridinyl) ethyl (meth)acrylate, 3-(1-aziridinyl) propyl (meth)acrylate, 4-(1-aziridinyl) butyl (meth)acrylate, 6-(1-aziridinyl) hexyl (meth)acrylate, 8-(1-aziridinyl) octyl (meth)acrylate, 2-vinyl-4,4-dimethyl-1,3-oxazolin-5-one, 2-isopropenyl-4,4-dimethyl-1,3-oxazolin-5-one, and combination thereof) with mono-(hydroxyethoxypropyl)-mono-alkyl-, mono-(hydroxy(polyethyleneoxy)propyl)-mono-alkyl-, mono-(aminopropyl)-mono-alkyl-, mono-(theylaminopropyl)-mono-alkyl-, or mono-carboxypropyl-terminated polydimethylsiloxane, a coupling product of an ethylenically functionalizing vinylic monomer (selected from the group consisting of allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl (meth) acrylamide, $C_1$-$C_6$ alkylamino-$C_2$-$C_6$ alkyl (meth)acrylamide, and combinations thereof) with mono-carboxypropyl-mono-alkyl-terminated polydimethylsiloxane in the presence of a carbodiimide as a coupling agent, a coupling product of an ethylenically functionalizing vinylic monomer (selected from the group consisting of (meth)acrylic acid, ethylacrylic acid, propylacrylic acid, butylacrylic acid, 2-acrylamidoglycolic acid, and combinations thereof) with mono-aminopropyl-mono-alkyl- or mono-ethylaminopropyl-mono-alkyl-terminated polydimethylsiloxane in the presence of a carbodiimide as a coupling agent, a coupling product of an ethylenically functionalizing vinylic monomer (selected from the group consisting of $C_2$-$C_4$ hydroxyalkyl (meth)acrylate, $C_2$-$C_4$ hydroxyalkyl (meth)acrylamide, allyl alcohol, allylamine, amino-$C_2$-$C_6$ alkyl (meth)acrylate, $C_1$-$C_6$ alkylamino-$C_2$-$C_6$ alkyl (meth)acrylate, vinylamine, amino-$C_2$-$C_6$ alkyl (meth)acrylamide, $C_1$-$C_6$ alkylamino-$C_2$-$C_6$ alkyl (meth)acrylamide, (meth)acrylic acid, and combination thereof) with mono-(hydroxyethoxypropyl)-mono-alkyl-, mono-(hydroxy(polyethyleneoxy)propyl-mono-alkyl-, mono-(aminopropyl)-mono-alkyl-, or mono-(ethylaminopropyl)-mono-alkyl-terminated polydimethylsiloxane through a di-epoxy compound (e.g., 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, or combinations thereof) or a di-isocyanate (e.g., isophorone diisocyanate, hexamethyl-1,6-diisocyanate, or 4,4'-dicyclohexylmethane diisocyanate).

In accordance with the invention, a siloxane-containing vinylic monomer is preferably a vinylic monomer of formula (6)

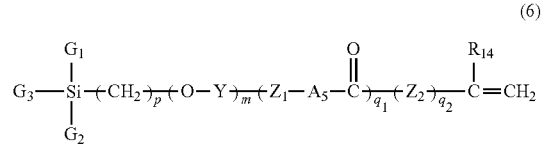

(6)

in which: $R_{14}$ is H or $CH_3$; $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —($CH_2CH_2O$)$_d$—$CH_2CH_2$ in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl; $q_1$ and $q_2$ independent of each other are an integer of 0 or 1; Y is a $C_1$-$C_6$ alkylene divalent radical or a $C_1$-$C_6$ alkylene divalent radical containing one or more hydroxyl groups, m is an integer of 0 to 5, p is an integer of 1 to 6, and $G_1$, $G_2$ and $G_3$ independent of each other are $C_1$-$C_6$ alkyl, phenyl, benzyl, or a radical of formula (7)

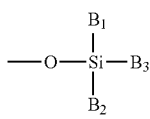

(7)

in which $B_1$, $B_2$ and $B_3$ independent of each other are $C_1$-$C_6$ alkyl, phenyl, or benzyl; provided that at least two of $G_1$, $G_2$ and $G_3$ are radicals of formula (7).

Examples of siloxane-containing vinylic monomers of formula (6) include without limitation N-[tris(trimethylsiloxy) silylpropyl]methacrylamide, N-[tris(trimethylsiloxy)-silylpropyl]acrylamide, N-[tris(dimethylpropylsiloxy) silylpropyl]acrylamide, N-[tris(dimethylpropylsiloxy) silylpropyl]methacrylamide, N-[tris(dimethylphenylsiloxy) silylpropyl]acrylamide, N-[tris(dimethylphenylsiloxy) silylpropyl]methacrylamide, N-[tris(dimethylethylsiloxy) silylpropyl]acrylamide, N-[tris(dimethylethylsiloxy) silylpropyl]methacrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl) acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy) propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy) propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy) silyl] propyl allyl carbamate, 3-[tris(trimethylsiloxy)silyl] propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth)acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide.

A prepolymer of the invention can be obtained in a two-step process. In the first step, an intermediary copolymer with pendant or terminal functional group is obtained by copolymerizing a reactive mixture. In the second step, the intermediary copolymer is ethylenically functionalized by reacting it with an ethylenically functionalizing vinylic monomer according to a coupling reaction known to a person skilled in the art.

Preferably, the functional group of the intermediary copolymer is selected from the group consisting of hydroxyl groups (—OH), primary amino groups (—$NH_2$), secondary amino groups (—NHR), carboxyl groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof.

In accordance with the invention, a reactive mixture for preparing an intermediary copolymer comprises: (1) at least one polysiloxane-containing crosslinker; (2) one or more hydrophilic vinylic monomers; (3) a polymerizable UV-absorbing agent or a polymerizable latent UV-absorbing agent; (4) a free radical initiator; (5) optionally one or more monoethylenically functionalized polysiloxane-containing vinylic monomers or macromers; and (6) optionally siloxane units derived from at least one siloxane-containing vinylic monomer.

In a preferred embodiment, the intermediary copolymer with pendant or terminal functional groups is obtained by copolymerization of a reactive composition comprising (1) at least one polysiloxane-containing crosslinker; (2) one or more hydrophilic vinylic monomers; (3) a polymerizable UV-absorbing agent, a polymerizable latent UV-absorbing agent, and/or a polymerizable compound having a photoinitiating moiety and a UV-absorbing or latent UV-absorbing moiety; (4) a free radical initiator; (5) optionally one or more monoethylenically functionalized polysiloxane-containing vinylic monomers or macromers; and (6) optionally siloxane units derived from at least one siloxane-containing vinylic monomer, provided that at least one of components (1)-(3) and (5) further comprises at least one functional group through which an ethylenically unsaturated group can be covalently linked to the obtained intermediary copolymer.

Any know suitable vinylic monomer containing at least one functional group can be used in the actinically polymerizable composition for preparing the intermediary copolymer with pendant or terminal functional groups. Preferred examples of such vinylic monomers includes methacrylic acid (MAA), acrylic acid, glycidylmethacrylate, glycidylacrylate, HEMA, HEA, methacrylic anhydride, N-hydroxymethylacrylamide (NHMA), 2-bromoethylmethacrylate, and vinylbenzylchloride.

It should be understood that a vinylic monomer can be used both as a hydrophilic vinylic monomer and as a functionalizing vinylic monomer in the actinically polymerizable composition for preparing the intermediary copolymer with pendant or terminal functional groups.

In a more preferred embodiment, the intermediary copolymer with pendant or terminal functional groups is obtained by copolymerization of a composition comprising (1) at least one polysiloxane-containing crosslinker; (2) one or more hydrophilic vinylic monomers; (3) a polymerizable UV-absorbing agent, a polymerizable latent UV-absorbing agent, and/or a polymerizable compound having a photoinitiating moiety and a UV-absorbing or latent UV-absorbing moiety; (4) a free radical initiator; (5) optionally one or more monoethylenically functionalized polysiloxane-containing vinylic monomers or macromers; (6) optionally siloxane units derived from at least one siloxane-containing vinylic monomer; and (7) at least one chain transfer agent having a functional group through which an ethylenically unsaturated group can be covalently linked to the obtained intermediary copolymer.

The functional chain transfer agent is used to control the molecular weight of the resulting copolymer and to provide functionality for subsequent addition of an ethylenically unsaturated group. The chain transfer agent may comprise one or more thiol groups, for example two or most preferably one thiol group. Suitable chain transfer agents include without limitation 2-mercaptoethanol, 2-aminoethanethiol, 2-mercaptopropionic acid, thioglycolic acid, thiolactic acid, or other hydroxymercaptanes, aminomercaptans, carboxyl-containing mercaptanes, and mixtures thereof.

The reactive mixture can further comprise one or more members selected from the group consisting of a crosslinking agent (i.e., a compound comprising two or more ethylenically unsaturated groups and having a molecular weight of 700 daltons or less), a hydrophobic vinylic monomer other than a siloxane-containing vinylic monomer, and a hydrophilic prepolymer having two or more ethylenically unsaturated groups.

Examples of preferred crosslinking agents include without limitation tetra(ethyleneglycol)diacrylate, tri(ethyleneglycol)diacrylate, ethyleneglycol diacylate, di(ethyleneglycol)diacrylate, tetraethyleneglycol dimethacrylate, triethyleneglycol dimethacrylate, ethyleneglycol dimethacylate, di(ethyleneglycol)dimethacrylate, trimethylopropane trimethacrylate, pentaerythritol tetramethacrylate, bisphenol A dimethacrylate, vinyl methacrylate, ethylenediamine dimethyacrylamide, glycerol dimethacrylate, triallyl isocyanurate, triallyl cyanurate, allylmethacrylate, dimers (e.g., 1,3-bis(methacrylamidopropyl)-1,1,3,3-tetrakis(trimethylsiloxy)disiloxane, 1,3-bis(N-methacrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(acrylamidopropyl)-1,1,3,3-tetrakis(trimethylsiloxy)disiloxane, 1,3-bis(methacryloxyethylureidopropyl)-1,1,3,3-tetrakis(trimethylsiloxy)disiloxane)disclosed in U.S. Pat. No. 4,711,943 (herein incorporated by reference in its entirety), and combinations thereof. A preferred cross-linking agent is tetra(ethyleneglycol)diacrylate, tri(ethyleneglycol)diacrylate, ethyleneglycol diacylate, di(ethyleneglycol)diacrylate, triallyl isocyanurate, or triallyl cyanurate.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethylmethacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, isobornyl acrylate, norbornyl methacrylate, norbornyl acrylate, trifluoroethyl methacrylate, hexafluoroisopropyl methacrylate, hexafluorobutyl methacrylate.

Examples of preferred hydrophilic prepolymers with multiple acryloyl or methacryloyl groups include, but are not limited to, poly(ethylene glycol)diacrylate, poly(ethylene glycol) dimethacrylate, poly(ethylene glycol)diacrylamide, poly(ethylene glycol)dimethacrylamide, a water-soluble crosslinkable prepolymera described in U.S. Pat. Nos. 5,583,163, 6,303,687, 5,849,841, 6,479,587, 5,712,356, 5,665,840, 6,492,478, 6,165,408, 6,221,303, and 6,472,48 (herein incorporated by reference in their entireties), and those described in U.S. Patent Application Publication No. 2004/0082680; 2005/0113549 (herein incorporated by reference in their entireties).

The reactive mixture for preparing an intermediary copolymer can be a melt, a solventless liquid in which all necessary components are blended together, or a solution in which all necessary component is dissolved in an inert solvent (i.e., should not interfere with the reaction between the reactants in the mixture), such as water, an organic solvent, or mixture thereof, as known to a person skilled in the art. A reactive mixture preferably comprises a solvent which dissolves all of the desirable components.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

The stoichiometry of the hydrophilic vinylic monomer(s), crosslinker(s) and chain transfer agent in the reactive mixture for preparing an intermediary copolymer may be chosen within wide limits and is strongly dependant on the intended use. For example, a molar ratio of from 0.5 to 5 equivalents chain transfer agent: 1 equivalent crosslinker (including polysiloxane-containing crosslinker and hydrophilic crosslinker): 5 to 60 equivalents hydrophilic monomer(s) has proven as practicable for biomedical purposes. A preferred range is from 1 to 3 molar equivalents chain transfer agent: 1 equivalent crosslinker (including polysiloxane-containing crosslinker and hydrophilic crosslinker): 10 to 50 molar equivalents hydrophilic monomer(s).

The weight average molecular weight of the resulting copolymers is strongly dependent, for example, on the amount of chain transfer agent used, and preferably is from 3000 to 1000000, preferably from 5000 to 500000, more preferably from 7000 to 250000 daltons.

A polymerizable UV-absorbing agent, a polymerizable latent UV-absorbing agent, and/or a polymerizable compound having a photoinitiating moiety and a UV-absorbing or latent UV-absorbing moiety is generally present in the reactive mixture in an amount sufficient to render a contact lens, which is obtained from the curing of the reactive mixture and is subjected to treatment to convert latent UV-absorbing moieties if applicable, absorbing at least about 80 percent of the UV light in the range of from about 280 nm to about 400 nm that impinges on the lens. A person skilled in the art will understand that the specific amount of UV-absorbing agent used in the reactive mixture will depend on the molecular weight of the UV-absorbing agent and its extinction coefficient in the range from about 280 to about 400 nm. In accordance with the invention, the reactive mixture comprises about 0.2% to about 5.0%, preferably about 0.5% to about 4.0%, by weight of a polymerizable UV-absorbing agent, a polymerizable latent UV-absorbing agent, and/or a polymerizable compound having a photoinitiating moiety and a UV-absorbing or latent UV-absorbing moiety.

In a preferred embodiment, the reactive mixture for preparing a prepolymer of the invention comprises: (1) from about 5% to about 60% by weight, preferably from about 10% to about 50% by weight, even more preferably from about 15% to about 55% by weight, even more preferably from about 20% to about 45% by weight, of one or more hydrophilic vinylic monomers; (2) from about 5% to about 75% by weight, preferably from about 10% to about 70% by weight, more preferably from about 15% to about 65% by weight, of a polysiloxane crosslinker; (3) from about 0.2% to about 5.0%, preferably about 0.5% to about 2.5%, by weight of a polymerizable UV-absorbing agent, a polymerizable latent UV-absorbing agent, and/or polymerizable compound having a photoinitiating moiety and a UV-absorbing or latent UV-absorbing moiety; (4) from zero to about 50%, more preferably from about 5% to about 45%, even more preferably from about 10% to about 40% by weight, of a siloxane-containing vinylic monomer of formula (6) (as described above) or monoethylenically functionalized polysiloxane vinylic monomer or macromer of formula (5) (as described above). The foregoing range combinations are presented with the proviso that the listed components and any additional components add up to 100% by weight.

The copolymerization of a polymerizable composition for preparing an intermediary copolymer may be induced photochemically or preferably thermally. Suitable thermal polymerization initiators are known to the skilled artisan and comprise, for example peroxides, hydroperoxides, azo-bis (alkyl- or cycloalkylnitriles), persulfates, percarbonates or mixtures thereof. Examples are benzoyl peroxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis(1-cyclohexanecarbonitrile), 2,2'-azo-bis(2,4-dimethylvaleronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere. Copolymerization can yield optical clear well-defined copolymers which may be worked up in conventional manner using for example extraction, precipitation, ultrafiltration and the like techniques.

In accordance with the invention, ethylenically functionalizing of the intermediary copolymer can be carried out by covalently attaching ethylenically unsaturated groups to the functional groups (e.g., amine, hydroxyl, carboxyl, isocyanate, epoxy groups) of the intermediary copolymer. Any vinylic monomer having a hydroxy, amino, carboxyl, epoxy, acid-chloride, isocyanate group, which is coreactive with isocyanate, amine, hydroxyl, carboxy, or epoxy groups of an intermediary copolymer in the absence or presence of a coupling agent (such as, e, g., EDC, diisocyanate, or diacid chloride), can be used in ethylenically functionalizing the intermediary copolymer. Examples of such vinylic monomers include, without limitation, for reacting with terminal hydroxy groups, 2-isocyanatoethyl methacrylate, 2-isocyanatoethyl acrylate, methacrylic anhydride, 3-isopropenyl-alpha, alpha-dimethylbenzyl isocyanate, acryloyl chloride, or methacryloyl chloride, glycidyl methacrylate; for reacting with terminal amine groups, 2-isocyanatoethyl methacrylate, 3-isopropenyl-alpha, alpha-dimethylbenzyl isocyanate, methacrylic anhydride, acrylic acid, methacrylic acid, acryloyl chloride, or methacryloyl chloride; for reacting with terminal carboxy groups in the presence of EDC, vinylamine, 2-aminoethyl methacrylate or 3-aminopropyl methacrylamide. The above list is not exhaustive but illustrative. A person skilled in the art will know how to select a vinylic monomer with a functional group to functionalize ethylenically intermediary copolymers.

In accordance with the invention, a prepolymer of the invention is soluble in a solvent so as to prepare a lens-forming fluid material for making silicone hydrogel contact lenses with UV-absorbing property. A prepolymer of the invention is capable of forming, preferably in the absence of any hydrophilic vinylic monomer and any crosslinking agents, a silicone hydrogel or contact lens.

In another aspect, the invention provides a soft contact lens capable of absorbing at least about 80 percent of the UV light in the range of from about 280 nm to about 400 nm that impinges on the lens. The soft contact lens of the invention comprises: a silicone hydrogel material that is obtained by curing a lens-forming material in a mold, wherein the lens-forming material comprises an actinically crosslinkable prepolymer which comprises, in the branched copolymer chains of the prepolymer, (1) crosslinking polysiloxane units derived from at least one polysiloxane-containing crosslinker; (2) hydrophilic units derived from one or more hydrophilic vinylic monomers; (3) UV-absorbing polymeric units, latent UV-absorbing polymeric units, or dual photo-functional polymeric units, wherein the UV-absorbing polymeric units are derived from a polymerizable UV-absorbing agent, wherein the latent UV-absorbing polymeric units are derived from a polymerizable latent UV-absorbing agent, wherein the dual photo-functional polymeric units are derived from a polymerizable compound having a photoinitiating moiety and a UV-absorbing or latent UV-absorbing moiety; (4) optionally dangling polysiloxane units derived from one or more monoethylenically functionalized polysiloxane-containing vinylic monomers or macromers, wherein the dangling polysiloxane units is free of ethylenically unsaturated group; and (5) optionally siloxane units derived from at least one siloxane-containing vinylic monomer.

In accordance with the invention, a lens-forming material is a fluid composition, which can be a solution or a melt at a temperature from about 20° C. to about 85° C. Preferably, a lens-forming material is a solution of at least one prepolymer of the invention and other desirable components in water, or an organic solvent, or a mixture of water and one or more organic solvents.

A solution of at least one prepolymer can be prepared by dissolving the prepolymer and other components in any suitable solvent known to a person skilled in the art. Examples of suitable solvents are described above.

All of the various embodiments described above of the prepolymer of the invention and solvents can be used in this aspect of the invention.

It must be understood that a lens-forming material can also comprise various other components, such as, for example, polymerization initiators (e.g., photoinitiator or thermal initiator), a visibility tinting agent (e.g., dyes, pigments, or mixtures thereof), photosensitizers, inhibitors, antimicrobial agents (e.g., preferably silver nanoparticles), bioactive agent, leachable lubricants, fillers, and the like, as well known to a person skilled in the art.

It must be understood that a lens-forming material can also comprise various other components, such as, for example, polymerization initiators (e.g., photoinitiator or thermal initiator), a visibility tinting agent (e.g., dyes, pigments, or mixtures thereof), photosensitizers, inhibitors, antimicrobial agents (e.g., preferably silver nanoparticles), bioactive agent, leachable lubricants, fillers, and the like, as known to a person skilled in the art.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine oxide initiators include 2,4,6-trimethylbenzoyldiphenylophosphine oxide; bis-(2,6-dichlorobenzoyl)-4-N-propylphenylphosphine oxide; phenyl-bis(2,4,6-trimethylbenzoyl)-phosphine oxide; diphenyl-bis(2,4,6-trimethylbenzoyl)-phosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Where the prepolymer comprises UV-absorbing units and the curing of the lens is performed by UV-irradiation, it is preferably (but not necessarily) that a benzoylphosphine oxide initiator is used in the lens-forming material to initiate curing of the lens-forming material in a mold.

Examples of preferred pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, etc. See Marmiom DM Handbook of U.S. Colorants for a list of colorants that may be used with the present invention. A more preferred embodiment of a pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups).

Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_n$ of the non-crosslinkable hydrophilic polymer is preferably from 5,000 to 500,000, more preferably from 10,000 to 300,000, even more preferably from 20,000 to 100,000.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for preparing ocular lenses. For example, polymeric materials, such as polyethylene, polypropylene, polystyrene, PMMA, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, or the like can be used. Other materials that allow UV light transmission could be used, such as, quartz, glass, sapphire, $CaF_2$.

In a preferred embodiment, when the polymerizable components in the lens-forming material is composed essentially of prepolymers, reusable molds can be used. Examples of reusable molds suitable for spatial limitation of radiation include without limitation those disclosed in U.S. Pat. Nos. 6,800,225, 6,627,124, 7,384,590, and 7,387,759, which are incorporated by reference in their entireties. In this aspect, the lens-forming material is poured into a mold consisting of two mold halves not touching each other but having a thin gap of annular design arranged between them. The gap is connected to the mold cavity, so that excess lens-forming material can flow into the gap. Instead of polypropylene molds that can be used only once, it is possible for reusable quartz, glass, sapphire or $CaF_2$ molds to be used, since, following the production of a lens, these molds can be cleaned rapidly and effectively to remove unreacted materials and other residues, using water or a suitable solvent, and can be dried with air. Reusable molds can also be made of a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced and high fidelity to the lens design.

In accordance with the invention, the lens-forming material can be introduced (dispensed) into a cavity formed by a mold according to any known methods.

After the lens-forming material is dispensed into the mold, it is polymerized to produce a contact lens. Crosslinking may be initiated in the mold e.g. by means of actinic radiation, such as UV/visible irradiation, ionizing radiation (e.g., gamma or X-ray irradiation). Where prepolymers of the invention are the polymerizable components in the lens-forming material, the mold containing the lens-forming material can be exposed to a spatial limitation of actinic radiation to crosslink the prepolymers.

The crosslinking according to the invention may be effected in a very short time, e.g. in $\leq 5$ minutes, advantageously in $\leq 3$ minutes, preferably in $\leq 2$ minutes, more preferably in $\leq 1$ minute, most preferably in 5 to 50 seconds.

Opening of the mold so that the molded article can be removed from the mold may take place in a manner known per se.

The molded contact lenses can further subject to further processes, such as, for example, surface treatment (for example, such as, plasma treatment, chemical treatments, the grafting of hydrophilic monomers or macromers onto the surface of a lens, Layer-by-layer coating, etc.); packaging in lens packages with a packaging solution which can contain about 0.005% to about 5% by weight of a wetting agent (e.g., a hydrophilic polymer described above) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization; and the like.

Preferred surfaces treatments are LbL coating such as those described in U.S. Pat. Nos. 6,451,871, 6,719,929, 6,793,973, 6,811,805, 6,896,926 (herein incorporated by references in their entirety) and plasma treatment. A preferred plasma treatment is those processes in which an ionized gas is applied to the surface of an article as described in U.S. Pat. Nos. 4,312,575 and 4,632,844 (incorporated herein by reference in their entireties).

A contact lens of the invention has an oxygen permeability of preferably at least about 40 barrers, more preferably at least about 60 barrers, even more preferably at least about 80 barrers. In accordance with the invention, an oxygen permeability is an apparent (directly measured when testing a sample with a thickness of about 100 microns) oxygen permeability according to procedures described in Examples.

A contact lens of the invention has an elastic modulus of about 2.0 MPa or less, preferably about 1.5 MPa or less, more preferably about 1.2 or less, even more preferably from about 0.4 MPa to about 1.0 MPa.

A contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A contact lens of the invention further has a water content of preferably from about 15% to about 55%, more preferably from about 20% to about 38% by weight when fully hydrated. The water content of a silicone hydrogel contact lens can be measured according to Bulk Technique as disclosed in U.S. Pat. No. 5,849,811.

In a further aspect, the invention provides a method for producing soft contact lenses capable of absorbing at least about 80 percent of the UV light in the range of from about 280 nm to about 370 nm that impinges on the lens. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises an actinically crosslinkable prepolymer which comprises, in the branched copolymer chains of the prepolymer, (1) crosslinking polysiloxane units derived from at least one polysiloxane-containing crosslinker; (2) hydrophilic units derived from one or more hydrophilic vinylic monomers; (3) UV-absorbing polymeric units, latent UV-absorbing polymeric units, or dual photo-functional polymeric units, wherein the UV-absorbing polymeric units are derived from a polymerizable UV-absorbing agent, wherein the latent UV-absorbing polymeric units are derived from a polymerizable latent UV-absorbing agent, wherein the dual photo-functional polymeric units are derived from a polymerizable compound having a photoinitiating moiety and a UV-absorbing or latent UV-absorbing moiety; (4) optionally dangling polysiloxane units derived from one or more monoethylenically functionalized polysiloxane-containing vinylic monomers or macromers, wherein the dangling polysiloxane units is free of ethylenically unsaturated group; and (5) optionally siloxane units derived from at least one siloxane-containing vinylic monomer; and actinically irradiating the lens forming material in the cavity to form a contact lens.

All of the various embodiments of the molds, reactive mixture, and spatial limitation of radiation, and contact lens of the invention described above can be used in this aspect of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various aspects and embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLE 1

Oxygen permeability measurements. The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt/(P_{oxygen})$$

where J=oxygen flux [microliters $O_2/cm^2$-minute]
$P_{oxygen}=(P_{measured}-P_{water}$ vapor$)=(\%\ O_2$ in air stream) [mm Hg]=partial pressure of oxygen in the air stream
$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)
where $Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements. The ion permeability of a lens is measured according to procedures described in U.S. Pat. No. 5,760,100 (herein incorporated by reference in its entirety. The values of ion permeability reported in the following examples are relative ionoflux diffusion coefficients $(D/D_{ref})$ in reference to a lens material, Alsacon, as reference material. Alsacon has an ionoflux diffusion coefficient of $0.314 \times 10^{-3}$ $mm^2$/minute.

EXAMPLE 2

Preparation of Polydimethylsiloxane (PDMS) Crosslinker A

In a 4 L beaker dissolve 700 grams of PDMS diamine KF-8008 in 1000 grams of hexane. In a 2 L beaker, dissolve 25 grams of sodium carbonate monohydrate in 1.6 L of 5% NaCl solution. Add both solutions into a 4 L reactor and stir at 600 rpm for 30 minutes. Prepare a solution containing 15 grams of acryloyl chloride and 72 grams of hexane. Add this acryloyl chloride solution to the stirred mixture in the 4 L reactor drop wise over 1 hour. Leave the mixture stirring for an addition hour after addition is complete. Then add 200 mL of saturated NaCl aqueous solution. Continue stirring for another 10 minutes. Stop stirring and allow phases to separate overnight. Remove the aqueous layer and add an additional 200 mL of DI water to the organic layer. Stir the mixture at 250 rpm for 10 minutes. Stop stirring and allow to phases to separate. The aqueous layer is removed. The DI water addition, stirring, and settling steps are repeated a total of 3 times. The hexane solution is then drained into a beaker containing a magnetic stir bar. The solution is cooled using an ice bath. 183 grams of anhydrous magnesium sulfate is added with stirring. The magnesium sulfate is removed by vacuum filtration. The hexane from the filtrate is removed under reduced pressure using a rotovap. After most of the hexane is removed using the rotovap, the sample is put under higher vacuum (down to 0.17 mBar) until the sample weight remains constant.

Preparation of Polydimethylsiloxane (PDMS) Crosslinker B

The procedure is the same as used for Crosslinker A except 700 grams of PDMS diamine KF-8012, 62 grams of sodium carbonate monohydrate, 37.10 grams of acryloyl chloride is used.

Preparation of Polydimethylsiloxane (PDMS) Crosslinker C

PDMS crosslinker C is prepared according to either of the two processes described below.

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., PDMS crosslinker C).

240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI is added through an addition funnel over 10 minutes to the reactor under moderate stirring. The reaction is kept for 2 hours at 60° C. 630 g of KF-6002 dissolved in 452 g of distilled MEK is then added and stirred until a homogeneous solution is formed. 0.235 g of DBTDL is added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain IEM-PDMS-IPDI-PDMS-IPDI-PDMS-IEM (i.e., PDMS crosslinker C).

Preparation of Polydimethylsiloxane (PDMS) Crosslinker D

Step 1

Crosslinker D is made by the reaction of 2 equivalents of isophorone diisocyanate (IPDI) with PDMS KF6001A using dibutyltin dilaurate as a catalyst. The KF6001A is charged to the vessel, and the reactor is sealed and heated to 60° C. A vacuum is applied to <10 mBar, and water is stripped. The diol is stirred with moderate agitation and the drying is continued for about 12 hours.

The amount of IPDI to add to the KF6001A is calculated from the total KF6001A hydroxyl equivalents in the reactor. The IDPI is charged to the KF6001A in the reactor. With moderate to heavy agitation, the IPDI is dissolved in the KF6001A. The reaction is stirred for 30 minutes at 20° C. to fully dissolve the IPDI. Under positive flow of gas, the reactor is opened and DBTDL is injected into the reaction mixture. The weight of DBTDL is 0.0875% of the KF-6001A weight. An exotherm occurs, raising temperature as much as 45° C. The reaction is allowed to proceed for 2 hours.

Step 2

Moisture is removed from the KF-6002A by connecting the KF-6002A container to a vacuum while stirring at an elevated temperature. The KF-6002A is subsequently stored under inert gas. The same milliequivalents of KF-6002A-OH are used for the Step 2 reaction as milliequivalents of IPDI-NCO used for the Step 1 Reaction, to give a 1:1 diol to isocyanate mole ratio. The same weight of DBTDL as used in Step 1 is added to the reactor. The batch is stirred for 4 hours following the KF-6002A addition, at a controlled jacket temperature maintaining the reaction mixture at 50 to 55° C. for the remaining hold time. The reaction is cooled to 20 to 25° C. The Step 2 product is sampled for NCO check via IR analysis.

Step 3

The IEM is analyzed by means of NMR for NCO end group analysis. The amount of IEM needed for the Step 3 reaction equals on the number of IEM-NCO milliequivalents as the number of KF-6002A-OH milliequivalents added to Step 2. A dry air sparge is started in the Step 2 product, at a high rate of stirring. These materials are stirred for a minimum of 30 minutes at 20 to 25° C., to thoroughly aerate the solution. The IEM is then added to the reactor, followed by the addition of the same weight of DBTDL as used in Step 1. The rate of the dry air sparge is reduced and maintained throughout the reaction. The exotherm should not exceed 40° C. Cooling is allowed to control the exotherm temperature. The batch is stirred for at least 5 hours with no external cooling. After that time period, the batch is sampled to check the disappearance of the isocyanate function via NMR analysis. If it appears that the reaction is not finished, the batch continues to be stirred and sampled until the free-NCO peak disappears or is not changing.

Preparation of Polydimethylsiloxane Crosslinker E

This preparation follows the preparation of Crosslinker D, except only 80% of the desired IEM is added.

EXAMPLE 3

A1. Preparation of UV Absorbing Macromers Containing Norbloc

A 2-L jacketed reactor is equipped with a heating/chilling loop, reflux condenser with $N_2$-inlet adapter, two septum-inlet adapters with stopcock and side-arm, a thermocouple adaptor, and overhead stirring is used. A solution is generated by dissolving 54.86 g of PDMS crosslinker A produced in Example 2 and 6.22 g of PDMS crosslinker B produced in Example 2 in 137 g of 1-propanol. This solution is charged to the reactor and cooled to 4° C. The solution is degassed by evacuating to less than 5 mBar, holding at vacuum for 15 minutes, and then re-pressurizing with nitrogen. This degas procedure is repeated for a total of 5 times.

In a separate 500 mL flask equipped with a magnetic stir bar and a vacuum-inlet adapter with valve, 2.84 g of cysteamine hydrochloride is dissolved in 87 grams of 1-propanol. Add a stir bar to the mixture and stir to dissolve.

In another 500 mL flask equipped with a magnetic stir bar and vacuum-inlet adapter with valve, a monomer solution containing 28.84 g of N,N-dimethylacrylamide (DMA), 7.20 g of Hydroxyethyl acrylate (HEA), and 2.474 g of 2-{3-(2H-Benzotriazol-2-yl)-4-hydroxyphenyl}ethyl methacrylate (Norbloc) is dissolved in 202 g of 1-propanol. Stir the mixture using a magnetic stir bar.

In a third flask, similarly equipped, 0.14 g of azo-bis(isobutyronitrile) (AIBN) is dissolved in 14 g of 1-propanol. All three solutions are degassed twice by evacuation to 50 mBar, holding vacuum for 5 minutes, and then re-pressurizing with nitrogen.

A dosing solution is prepared by dissolving 0.72 g of HEA, 2.88 g of DMA in 21 grams of 1-propanol. The dosing solution is degassed by using an HPLC pump and circulating the solution through a Select™ Degassing System by Alltech for at least 30 minutes.

Under a positive flow of nitrogen, the reactor is opened and the cysteamine hydrochloride and the monomer solutions are charged to the reactor. A total of 124 g of 1-propanol is used to rinse the glassware from these solutions and added to the reactor. Still holding at 4° C., the reactor is degassed by evacuating to less than 5 mBar and holding for 5 minutes, then re-pressurizing with nitrogen. A total of four degassing cycles are performed. The reactor is then heated to about 80° C. over about 45 minutes. Once the solution temperature reached at least 78° C., the AIBN solution is injected into the reactor under nitrogen. At the same time, start the addition of the dosing solution at a rate of 0.146 mL/min. The temperature of the reaction mixture is maintained at 80° C. for 3 hours. After 3 hours reaction mixture is then cooled to room temperature.

The solution is then transferred to a round bottom flask and about 400 mL of water is added slowly with agitation. 1-Propanol is removed under vacuum at about 40° C./100 mBar on a rotary evaporator. After the first 500 mL of 1-propanol is removed, 500 mL of water is added slowly with stirring. The mixture is then further stripped of 1-propanol until about 400 mL of distillate is collected. 400 mL of water is again added back to the mixture, and an additional 400 mL of 1-propanol is collected. An additional 400 mL of water is added, then solvent-exchange is continued to collect a final 300 mL of distillate. The mixture is then diluted to 2 kg.

This mixture is then charged to a 2-L reactor equipped with overhead stirring, refrigeration loop, thermometer, and the pH meter and dispensing tip of a Metrohm Model 718 STAT Titrino. The reaction mixture is cooled to less than 1° C. 1.5 g of $NaHCO_3$ is added to the mixture and stirred to dissolve. The Titrino is set to maintain pH at 9.5 by intermittent addition of 15% sodium hydroxide solution. 6.7 mL of acryloyl chloride is then added over one hour using a syringe pump. The mixture is then drained from the reactor, and filtered through a course fritted glass funnel. The mixture is purified by diafiltration (nominal molecular weight cut-off, 10,000D) with deionized water until the permeate conductance is below 2.5 µS/cm, and the polymer is isolated by lyophilization.

A2. Preparation of UV absorbing Macromers Containing Norbloc

Copolymer Synthesis. A 1-L jacketed reactor is equipped with 500-mL addition funnel, overhead stirring, reflux condenser with nitrogen/vacuum inlet adapter, thermometer, and sampling adapter. 45.98 g Crosslinker E in Example 2 is charged to the reactor and the reactor is sealed. A solution of 0.512 g of hydroxyethylmethacrylate, 25.354 g of dimethylacrylamide, 1.38 g of Norbloc methacrylate, 26.034 g of (tris(trimethylsilyl))siloxypropyl)methacrylate, in 263 g of ethyl acetate is charged to the addition funnel. The reactor is degassed at <1 mbar for 30 minutes at RT with a high-vacuum pump. The monomer solution is degassed three times at 100 mbar, RT for 10 minutes, breaking vacuum with nitrogen between degas cycles. The monomer solution is then charged to the PDMS in the reactor, and then the reaction mixture is stirred and heated to 67° C. While heating a solution of 1.480 g of mercaptoethanol and 0.260 g of azoisobutyronitrile dissolved in 38 g of ethyl acetate is charged to the addition funnel and deoxygenated three times at 100 mbar, RT for 10 minutes. When the reactor is at temperature, the initiator solution is added to the PDMS/monomer solution. The reaction is allowed to proceed for 8 hours, and then heating is discontinued and reactor temperature is brought to room temperature within 15 minutes.

UV-Macromer Synthesis. The above reaction mixture is decanted to a dry single-neck flask with airtight lid, and 3.841 g of isocyanatoethyl acrylate is added with 0.15 g of dibutyltin dilaurate. The mixture is stirred 24 hours at room temperature. 10.0 mg of hydroxy-tetramethylene piperonyloxy is added to the macromer solution. The solution is concentrated to 200 g (~50%) and filtered through 1 um pore size filter paper. The solid content is measured via removing the solvent at vacuum oven at 80° C.

Note: isocyanatoethyl acrylate can be replaced with isocyanatoethyl methacrylate to prepare UV macromer containing methacrylate groups.

B. Preparation of UV Absorbing Macromers Containing UV-416

Procedure A1 is followed to make this macromer except instead of adding Norbloc, 3.50 grams of 2-hydroxy-4-acryloxyethoxy benzophenone (UV-416) is added.

C. Preparation of UV Absorbing Macromers Containing BZT

Procedure A1 is followed to make this macromer except instead of adding Norbloc, 1.265 grams of 2-(1,1-dimethylethyl)-4-[3-[(4-ethenylphenyl)methoxy]propoxy]-6-(5-methoxy-2H-benzotriazol-2-yl)-phenol (BZT) is added.

D. Preparation of UV Absorbing Formulation Containing Norbloc 34.0 g of the macromer obtained according to step A1 above is dissolved in approximately 140 mL of 1-propanol. The solution is filtered to 1.0 µm exclusion. The solution is concentrated to 65% solids under reduced pressure using a rotovap. 51.52 g of solution at 64.83% solids is recovered. The formulation is prepared by dissolving 0.068 g of Diphenyl(2,4,6-trimethylbenzoyl)-phosphine oxide (TPO) in 15 g of the macromer solution.

E. Preparation of UV Absorbing Formulation Containing UV-416 and BZT

A formulation is made according to example D, but containing 46% of the macromer from example B, 24% of the macromer from example C, 29% of macromer that does not contain UV absorbers, and 0.7% TPO.

F. Preparation of contact lenses Containing Norbloc (Absorber 1)

Poly(propylene) contact lens molds (DSM) are filled with the formulation from example D and the molds are closed. 330 and 395 cutoff filters are used to filter-out shorter wavelength radiation. The molds are then irradiated for 68 seconds with a UV/Vis light source having an intensity of about 21 mW/cm$^2$. The molds are then opened, and the mold halves which have a lens attached are soaked in ethanol for a minimum of 60 seconds. The lenses are removed from the molds and placed into ethanol and extracted for approximately 60 seconds with stirring. The lenses are then placed into a container with DI water and stirred for a minimum of 30 seconds. This rinsing step is repeated two additional times. After the third rinse step the lenses are stored in DI water. If a lens coating is not desired, the lenses are autoclaved in about 2 mL of PBS (phosphate buffered saline).

G. Preparation of contact lenses Containing UV-416 and BZT (Absorber 2)

Poly(propylene) contact lens molds (DSM) are filled with the formulation from example E and the molds are closed. 330 and 395 cutoff filters are used to filter-out shorter wavelength radiation. The molds are then irradiated for 53 s with a UV/Vis light source having an intensity of about 21 mW/cm$^2$. The lenses are autoclaved in about 2 mL of PBS.

H. Preparation of UV Absorbing Macromers Containing Norbloc and TRIS

A 2-L jacketed reactor equipped with a heating/chilling loop, reflux condenser with $N_2$-inlet adapter, two septum-inlet adapters with stopcock and side-arm, a thermocouple adaptor, and overhead stirring is used. Add 3.3 grams of Norbloc, 40 grams of crosslinker C, 31.47 grams of DMA, 5.245 grams of HEA, 15.7385 grams of TRIS-methacrylate and 560 grams of t-amyl alcohol. Chill the mixture with stirring until the solution temperature gets between 0 to −5° C. The solution is degassed by evacuating to less than 1 mBar, holding vacuum for 5 minutes, and then re-pressurizing with nitrogen. The degas procedure is repeated for a total of 12 times.

In a separate 250 mL pear-shaped flask equipped with a magnetic stir bar and a vacuum-inlet adapter with valve, 0.15 g of azo-bis(isobutyronitrile) (AIBN) is dissolved in 40 g of t-amyl alcohol. In a 20 mL scintillation vial, 0.80 grams of cysteamine hydrochloride is dissolved in 1.2 grams of methanol. Once dissolved, the cysteamine solution is added drop wise with stirring to the AIBN solution. This new solution is degassed three times by evacuation to 50 mBar, holding vacuum for 10 minutes, and then re-pressurizing with nitrogen.

In a separate scintillation vial, 1.60 grams of cysteamine hydrochloride is dissolved in 2.4 gram of methanol. Once dissolved add this solution drop wise to 100 grams of t-amyl alcohol with stirring. This dosing solution is degassed by using an HPLC pump and circulating the solution through a Select™ Degassing System by Alltech for at least 30 minutes.

Heat solution in the reactor by setting the heater to 70° C. When the solution temperature in reactor reached 64° C., add the AIBN/Cysteamine solution into the reactor using a degassed syringe. At the same time, begin dosing the Cysteamine solution into the reactor at a rate of 1 mL/min. The kinetics of copolymerization is followed by GC analysis. After 5 hours the reaction mixture is then cooled to room temperature.

The solution is then transferred to a round bottom flask and the copolymer is solvent exchanged from t-amyl alcohol to 2-propanol then to water. The copolymer is purified by diafiltration using water with 10 kDa membranes.

This mixture is then charged to a 2-L reactor equipped with overhead stirring, refrigeration loop, thermometer, and the pH meter and dispensing tip of a Metrohm Model 718 STAT Titrino. The reaction mixture is cooled to less than 1° C. 6.28 g of $NaHCO_3$ is added to the mixture and stirred to dissolve. The Titrino is set to maintain pH at 9.5 by intermittent addition of 15% sodium hydroxide solution. 12.15 mL of acryloyl chloride is then added over two hours using a syringe pump. After addition is complete, let the solution stir for another hour. Neutralize the solution to a pH of 7 using 2N aqueous HCl while warming the solution to room temperature. The solution is then drained from the reactor, and filtered through a course fritted glass funnel. The mixture is purified by diafiltration (nominal molecular weight cut-off, 10,000D) with a 50/50 mixture of deionized water and 1-propanol until the permeate conductance is below 4 μS/cm. At this time solvent exchange the macromer solution into 100% 1-propanol. When the water content of the macromer mixture is less than 1000 ppm, the macromer is ready to formulate.

I1. Preparation of UV Absorbing Formulations Containing Norbloc and TRIS

The formulation is prepared by dissolving 0.1125 g of Diphenyl(2,4,6-trimethylbenzoyl)-phosphine oxide (TPO) in enough macromer solution from step H to contain 9.75 grams of macromer. The excess 1-propanol is removed under vacuum using a rotovap to yield a macromer concentration of 65%.

I2. Preparation of UV Absorbing Formulations Containing Macromer A1

0.05 grams of TPO and 0.0375 grams of DMPC are weighed into a small amber vial. Enough of macromer solution A2 is added to yield 3.55 grams of macromer (71% of total formulation is macromer). About 9 grams of 1-propanol is added to the vial. A rotovap is used to remove about 14 mL of solvent. Another 9 grams of 1-propanol is added and about 11 mL of solvent is removed. This procedure is repeated twice more. Enough solvent is removed the last time to get to a formulation weigh of 4.8 grams. Then 0.2 grams of DMA is added. The formulation is mixed by slowly rolling for at least 2 hours.

J. Preparation of UV Absorbing Lenses Containing Norbloc and TRIS

Poly(propylene) contact lens molds (DSM) are filled with the formulation from example I2 and the molds are closed. A 380 nm cutoff filters are used to filter-out shorter wavelength radiation. The molds are then irradiated for 50 seconds with a UV/Vis light source having an intensity of about 13 mW/cm². The lenses are extracted with IPA in two steps. The first step is 2 minutes and the second is 20 minutes in a separate IPA bath. The lenses are then coated with poly(acrylic acid), then autoclaved in about 2 mL of PBS.

K. Preparation of Lenses from Formulation I2

The formulation from I2 is centrifuged for 45 minutes at 4500 rpm in a dosing syringe. The formulation is dosed into the front curve light stream (LS) mold. After closing the molds, the formulation is cured by light from a Hamamatsu LC5 lamp that passes through a 388 nm long pass Asahi cutoff filter. The intensity of light used is 4.6 mW/cm². The duration of cure is 22 seconds. The lens is removed from the mold, then extracted and coated using the following procedure: (1) 22 seconds in MEK; (2) 78 seconds in MEK; (3) 224 seconds in MEK; (4) 56 seconds in DI water; (5) 44 seconds in PAA/1-propanol solution; (6) 56 seconds in PAA/1-propanol solution; (7) 56 seconds in DI water; (8) 56 seconds in DI water; and (9) 56 seconds in DI water. The lenses are inspected for defects, packaged in PBS and autoclaved.

The lens properties are shown in the Table below.

| Lenses | IP | Dk apparent | Average UVA % T | Average UVB % T |
|--------|-----|-------------|-----------------|-----------------|
| F | 6.7 | 68 (CT = 57) | 10.2 (CT = 57) | 0.10 |
| G | 7.2 | 73 (CT = 60) | 11.6 (CT = 60) | 0.74 |
| J | 2.2 | 110 (CT = 95) | 4.1 (CT = 82) | 0.07 |
| K | 2.9 | 101 (CT = 122) | 4.3 (CT = 107) | 0.09 |

L. Preparation of UV absorbing Monomeric Formulation

The following compounds are added together to make a formulation: 31.5% Chain extended PDMS Crosslinker D, 20.5% TRIS acrylamide, 23% DMA, 1% TPO, 0.25% LPEG2000, 1% Norbloc, 23.65% 1-propanol, and 0.1% tint dispersion.

M. Preparation of UV absorbing Monomeric Formulation

The following compounds are added together to make a formulation: 31.5% Chain extended PDMS Crosslinker D, 20.5% TRIS acrylamide, 23% DMA, 0.75% TPO, 0.25% LPEG2000, 1% Norbloc, 23.9% 1-propanol, and 0.1% tint dispersion.

N. Lens Fabrication and Analysis of Internal Stress using Cross-sections

Lenses are prepared from the formulations in examples I2, L, and M using the procedure found in example K. The only exceptions are the cutoff filters used and the light intensity. The table below demonstrates the benefit of using macromer-based formulations over monomer-based formulations. If a macromer-based formulation (I2) is cured under the same conditions, including intensity gradient, as a monomer-based formulation, the cross-sections of the finished lenses are much better from the macromer-based formulation. The intensity gradient is a calculation based on the amount of light used for curing that the formulation absorbs over a 100 um path length. Too high of an intensity gradient will cause different light dose seen by TPO at the bottom compared to the top of the formulation. This effect could cause internal stresses in the lenses that may manifest itself by looking at the shape of the cross-section. In the case of the monomer-based lenses, the cross-sections cured using the 388 nm cutoff filter are much flatter than lens itself. Monomer-based formulations require a lower intensity gradient to get a good cross-section. This is accomplished by reducing the TPO concentration and increasing the wavelength cutoff filter.

| Formulation | Cutoff filter (nm) | Intensity (mW/cm$^2$) | Intensity Gradient at 100 um (%) | Lens cross-section |
|---|---|---|---|---|
| I1 | 388 | 6.6 | 9 | good |
| L | 388 | 6.6 | 9 | bad, flat |
| M | 394 | 4.2 | 5 | good |

What is claimed is:

1. An actinically crosslinkable prepolymer, comprising: in the branched copolymer chains of the prepolymer, (1) crosslinking polysiloxane polymeric units derived from at least one polysiloxane-containing crosslinker; (2) hydrophilic polymeric units derived from one or more hydrophilic vinylic monomers; (3) dual photo-functional polymeric units, wherein the dual photo-functional polymeric units are derived from a polymerizable compound having an ethylenically unsaturated group, a photoinitiating moiety and a UV-absorbing or latent UV-absorbing moiety; (4) optionally dangling polysiloxane polymeric units derived from one or more monoethylenically functionalized polysiloxane-containing vinylic monomers or macromers, wherein the dangling polysiloxane units is free of ethylenically unsaturated group; and (5) optionally siloxane polymeric units derived from at least one siloxane-containing vinylic monomer, wherein the prepolymer comprises three or more ethylenically unsaturated groups and is soluble in a solvent to form a solution and capable of being actinically crosslinked, in the absence of one or more vinylic monomers or a crosslinking agent, to form a UV absorbing or blocking silicone hydrogel contact lens.

2. The prepolymer of claim 1, wherein the polysiloxane crosslinker is defined by formula (1)

$$Q\text{-}X_1\text{-}A_1\text{-}PDMS\text{-}A_2\text{-}X_2\text{-}Q \quad (1)$$

in which
$A_1$ and $A_2$ independent of each other is a linear or branched $C_1$-$C_{10}$ alkyl diradical which optionally comprises one or more hydroxyl or amino groups, a divalent radical of

in which q is an integer of from 1 to 5 and alk and alk' independent of each other is a $C_1$-$C_6$ alkylene divalent radical, or a divalent radical of —R'$_1$—X$_4$-E-X$_5$—R'$_2$— in which R'$_1$ and R'$_2$ independent of each other is a direct bond, a linear or branched $C_1$-$C_{10}$ alkylene divalent radical, or a divalent radical of

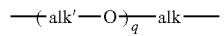

as defined above, $X_4$ and $X_5$ independent of each other are a linkage selected from the group consisting of —O—,

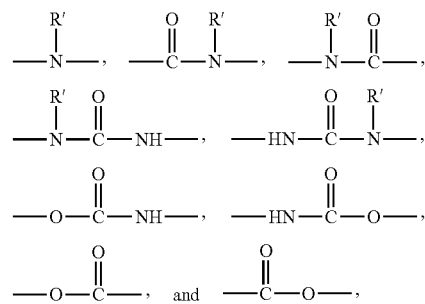

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms;

$X_1$ and $X_2$ independent of each other are a linkage selected from the group consisting of a direct bond,

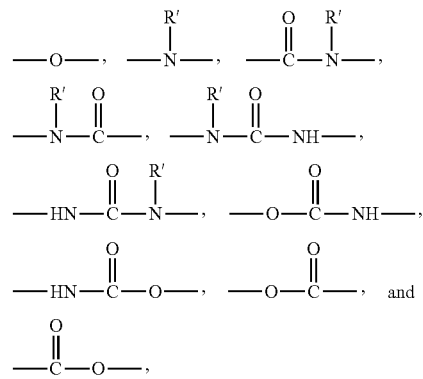

in which R' is H or $C_1$-$C_8$alkyl;

PDMS is a polysiloxane divalent radical of formula (2)

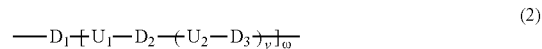

in which v is 0 or 1, ω is an integer of from 0 to 5, $U_1$ and $U_2$ independent of each other represent a divalent radical of —R'$_1$—X$_4$-E-X$_5$—R'$_2$— as defined above or a divalent radical of

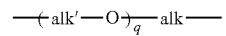

as defined above, $D_1$, $D_2$ and $D_3$ independently of each other are a divalent radical selected from the group consisting of —(CH$_2$CH$_2$O)$_t$—CH$_2$CH$_2$— in which t is an integer of 3 to 40, —CF$_2$—(OCF$_2$)$_a$—(OCF$_2$CF$_2$)$_b$—OCF$_2$— in which a and b independent of each other is an integer of 0 to 10 provided that a+b is a number in the range of 10 to 30, and a divalent group of formula (3)

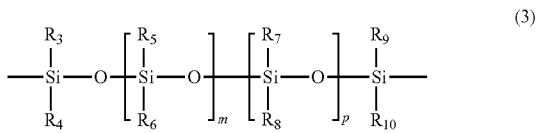 (3)

in which $R_3$, $R_4$, $R_5'$, $R_6$, $R_7$, $R_8$, $R_9$ and $R_{10}$, independently of one another, are $C_1$-$C_8$-alkyl, $C_1$-$C_4$ alkyl- or $C_1$-$C_4$- alkoxy-substituted phenyl, fluoro($C_1$-$C_{18}$-alkyl), cyano($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (3); and Q is an ethylenically unsaturated group of formula (4)

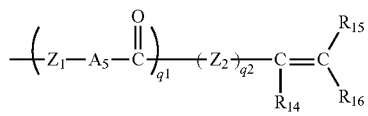 (4)

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —(CH$_2$CH$_2$O)$_d$—CH$_2$CH$_2$— in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl; $q_1$ and $q_2$ independent of each other are an integer of 0 or 1; $R_{14}$ is hydrogen or $C_1$-$C_4$ alkyl; $R_{15}$ and $R_{16}$ independent of each other are hydrogen, $C_1$-$C_4$ alkyl, phenyl, or carboxyl group.

3. The prepolymer of claim 1, wherein the prepolymer comprises siloxane polymeric units derived from at least one siloxane-containing vinylic monomer of formula (6)

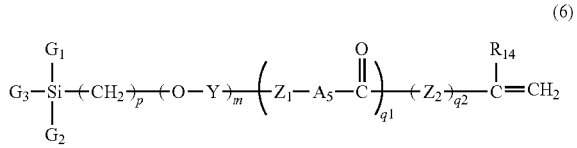 (6)

in which: $R_{14}$ is H or CH$_3$; $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —(CH$_2$CH$_2$O)$_d$—CH$_2$CH$_2$ in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl; $q_1$ and $q_2$ independent of each other are an integer of 0 or 1; Y is a $C_1$-$C_6$ alkylene divalent radical or a $C_1$-$C_6$ alkylene divalent radical containing one or more hydroxyl groups, m is an integer of 0 to 5, p is an integer of 1 to 6, and $G_1$, $G_2$ and $G_3$ independent of each other are $C_1$-$C_6$ alkyl, phenyl, benzyl, or a radical of formula (7)

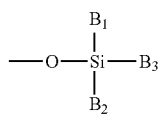 (7)

in which $B_1$, $B_2$ and $B_3$ independent of each other are $C_1$-$C_6$ alkyl, phenyl, or benzyl; provided that at least two of $G_1$, $G_2$ and $G_3$ are radicals of formula (7).

4. The prepolymer of claim 1, wherein the prepolymer comprises hydrophilic polymeric units derived from at least one hydrophilic vinylic monomer selected from the group consisting of N,N-dimethylacrylamide (DMA), N,N-dimethylmethacrylamide (DMMA), 2-acrylamidoglycolic acid monohydrate, 3-acryloylamino-1-propanol, N-hydroxyethyl acrylamide, N-[tris(hydroxymethyl)methyl]-acrylamide, N-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, acrylic acid, a $C_1$-$C_4$-alkoxy polyethylene glycol (meth)acrylate having a weight average molecular weight of from 200 to 1500, methacrylic acid, N-vinyl formamide, N-vinyl acetamide, N-vinyl isopropylamide, N-vinyl-N-methyl acetamide, allyl alcohol, N-vinyl caprolactam, and mixtures thereof.

5. An actinically crosslinkable prepolymer, comprising: in the branched copolymer chains of the prepolymer, (1) crosslinking polysiloxane polymeric units derived from at least one polysiloxane-containing crosslinker; (2) hydrophilic polymeric units derived from one or more hydrophilic vinylic monomers; (3) UV-absorbing polymeric units, latent UV-absorbing polymeric units, or dual photo-functional polymeric units, wherein the UV-absorbing polymeric units are derived from a polymerizable UV-absorbing agent, wherein the latent UV-absorbing polymeric units are derived from a polymerizable latent UV-absorbing agent, wherein the dual photo-functional polymeric units are derived from a polymerizable compound having an ethylenically unsaturated group, a photoinitiating moiety and a UV-absorbing or latent UV-absorbing moiety; (4) optionally dangling polysiloxane polymeric units derived from one or more monoethylenically functionalized polysiloxane-containing vinylic monomers or macromers, wherein the dangling polysiloxane units is free of ethylenically unsaturated group; (5) optionally siloxane polymeric units derived from at least one siloxane-containing vinylic monomer, and (6) hydrophobic polymeric units derived from at least one hydrophobic vinylic monomer selected from the group consisting of methylacrylate, ethylacrylate, propylacrylate, isopropylacrylate, cyclohexylacrylate, 2-ethylhexylacrylate, methylmethacrylate, ethylmethacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, isobornyl acrylate, norbornyl methacrylate, norbornyl acrylate, trifluoroethyl methacrylate, hexafluoro-isopropyl methacrylate, hexafluorobutyl methacrylate, wherein the prepolymer comprises three or more ethylenically unsaturated groups and is soluble in a solvent to form a solution and capable of being actinically crosslinked, in the absence of one or more vinylic monomers or a crosslinking agent, to form a UV absorbing or blocking silicone hydrogel contact lens.

6. A soft contact lens, having a UV-absorbing property characterized by being able to absorbing at least about 80 percent of a UV light in the range of from about 280 nm to about 370 nm that impinges on the lens; and comprising a silicone hydrogel material that is obtained by curing a lens-forming material in a mold, wherein the lens-forming material comprises an actinically crosslinkable prepolymer which comprises, in the branched copolymer chains of the prepolymer, (1) crosslinking polysiloxane polymeric units derived from at least one polysiloxane-containing crosslinker; (2) hydrophilic polymeric units derived from one or more hydrophilic vinylic monomers; (3) dual photo-functional polymeric units, wherein the dual photo-functional polymeric units are derived from a polymerizable compound having an ethylenically unsaturated group, a photoinitiating moiety and a UV-absorbing or latent UV-absorbing moiety; (4) optionally dangling polysiloxane polymeric units derived from one or more monoethylenically functionalized polysiloxane-containing vinylic monomers or macromers, wherein the dangling polysiloxane units is free of ethylenically unsaturated group; and (5) optionally siloxane polymeric units derived from at least one siloxane-containing vinylic monomer.

7. The soft contact lens of claim 6, wherein the polysiloxane crosslinker is defined by formula (1)

$$Q-X_1-A_I-PDMS-A_2-X_2-Q \quad (1)$$

in which $A_I$ and $A_2$ independent of each other is a linear or branched $C_1$-$C_{10}$ alkyl diradical which optionally comprises one or more hydroxyl or amino groups, a divalent radical of

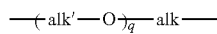

in which q is an integer of from 1 to 5 and alk and alk' independent of each other is a $C_1$-$C_6$ alkylene divalent radical, or a divalent radical of —$R'_1$—$X_4$-E-$X_5$—$R'_2$— in which $R'_1$ and $R'_2$ independent of each other is a linear or branched $C_1$-$C_{10}$ alkylene divalent radical or a divalent radical of

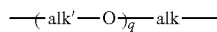

as defined above, $X_4$ and $X_5$ independent of each other are a linkage selected from the group consisting of

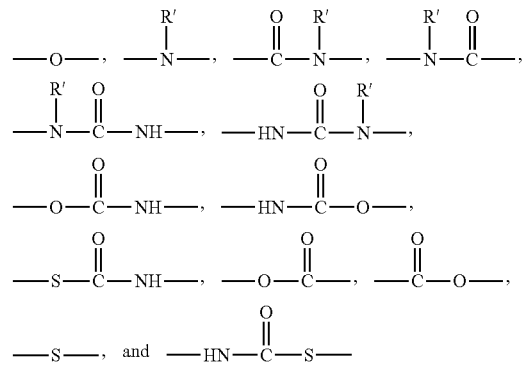

in which R' is H or $C_1$-$C_8$ alkyl, E is an alkyl diradical, a cycloalkyl diradical, an alkylcycloalkyl diradical, an alkylaryl diradical, or an aryl diradical with up to 40 carbon atoms which may have ether, thio, or amine linkages in the main chain;

$X_1$ and $X_2$ independent of each other are a linkage selected from the group consisting of a direct bond,

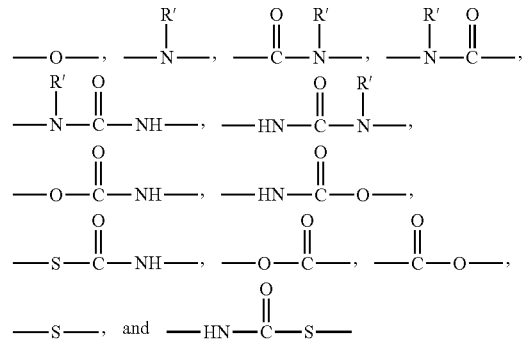

in which R' is H or $C_1$-$C_8$ alkyl;

PDMS is a polysiloxane divalent radical of formula (2)

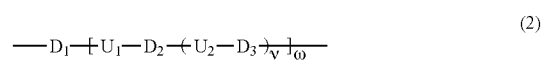

in which v is 0 or 1, ω is an integer of from 0 to 5, $U_1$ and $U_2$ independent of each other represent a divalent radical of —$R'_1$—$X_4$-E-$X_5$—$R'_2$— as defined above or a divalent radical of

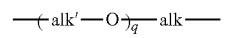

as defined above, $D_1$, $D_2$ and $D_3$ independently of each other are a divalent radical selected from the group consisting of —($CH_2CH_2O$)$_t$—$CH_2CH_2$— in which t is an integer of 3 to 40, —$CF_2$—($OCF_2$)$_a$—($OCF_2CF_2$)$_b$—$OCF_2$— in which a and b independent of each other is an integer of 0 to 10 provided that a+b is a number in the range of 10 to 30, and a divalent group of formula (3)

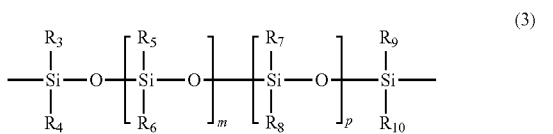
(3)

in which $R_3$, $R_4$, $R_5{}^1$, $R_6$, $R_7$, $R_8$, $R_9$ and $R_{10}$, independently of one another, are $C_1$-$C_8$-alkyl, $C_1$-$C_4$ alkyl- or $C_1$-$C_4$- alkoxy-substituted phenyl, fluoro($C_1$-$C_{18}$-alkyl), cyano($C_1$-$C_{12}$-alkyl), -alk-(OCH$_2$CH$_2$)$_n$—OR$_{11}$ in which alk is $C_1$-$C_6$-alkylene divalent radical, $R_{11}$ is $C_1$-$C_6$ alkyl and n is an integer from 1 to 10, m and p independently of each other are an integer of from 2 to 698 and (m+p) is from 5 to 700, provided that at least one of $D_1$, $D_2$ and $D_3$ is represented by formula (3); and Q is an ethylenically unsaturated group of formula (4)

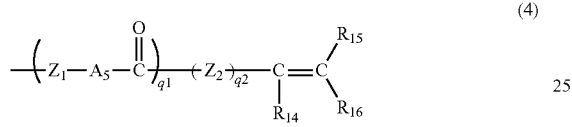
(4)

in which $Z_1$ and $Z_2$ independent of each other are a linear or branched $C_1$-$C_{12}$ alkylene divalent radical, a linear or branched $C_1$-$C_{12}$ alkylene divalent radical having one or more hydroxyl groups, a radical of —(CH$_2$CH$_2$O)$_d$—CH$_2$CH$_2$— in which d is an integer of 1 to 10, unsubstituted phenylene divalent radical, $C_1$-$C_4$ alkyl or $C_1$-$C_4$ alkoxy substituted phenylene divalent radical or $C_7$-$C_{12}$ arakylene divalent radical; $A_5$ is —O— or

in which R' is H or $C_1$-$C_8$ alkyl; $q_1$ and $q_2$ independent of each other are an integer of 0 or 1; $R_{14}$ is hydrogen, $C_1$-$C_4$ alkyl or halogen; $R_{15}$ and $R_{16}$ independent of each other are hydrogen, $C_1$-$C_4$ alkyl, phenyl, carboxy, halogen, or a radical of

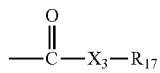

in which $X_3$ is

as defined above or —S— and $R_{17}$ is a $C_1$-$C_{12}$ alkyl, hydroxyalkyl, aminoalkyl, alkylaminoalkyl or dialkylaminoalkyl radical.

8. The soft contact lens of claim 7, wherein the contact lens has at least one property selected from the group consisting of an oxygen permeability of at least about 40 barrers, an elastic modulus of about 2.0 MPa or less, an Ionoflux Diffusion Coefficient, D, of at least about $1.5 \times 10^{-6}$ mm$^2$/min, and a water content of from about 15% to about 70%.

9. The soft contact lens of claim 7, further comprising a visibility tinting agent, an antimicrobial agent, bioactive agent, a leachable lubricant, or a combination thereof.

\* \* \* \* \*